(12) United States Patent
Kokubo et al.

(10) Patent No.: US 9,272,607 B2
(45) Date of Patent: Mar. 1, 2016

(54) VEHICLE SUNROOF DEVICE

(71) Applicant: AISIN SEIKI KABUSHIKI KAISHA, Kariya-shi, Aichi-ken (JP)

(72) Inventors: Yusuke Kokubo, Toyota (JP); Yoji Nagashima, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/383,931

(22) PCT Filed: Mar. 8, 2013

(86) PCT No.: PCT/JP2013/056441
§ 371 (c)(1),
(2) Date: Sep. 9, 2014

(87) PCT Pub. No.: WO2013/137137
PCT Pub. Date: Sep. 19, 2013

(65) Prior Publication Data
US 2015/0069794 A1   Mar. 12, 2015

(30) Foreign Application Priority Data

Mar. 15, 2012   (JP) ................................. 2012-059012
Mar. 15, 2012   (JP) ................................. 2012-059014

(51) Int. Cl.
*B60J 7/02*   (2006.01)
*B60J 7/043*   (2006.01)

(52) U.S. Cl.
CPC ... *B60J 7/02* (2013.01); *B60J 7/043* (2013.01)

(58) Field of Classification Search
CPC .............. B60J 7/02; B60J 7/043; B60J 7/057
USPC ............................................. 296/216.01–224
See application file for complete search history.

(56) References Cited

U.S. PATENT DOCUMENTS 3,737,194 A * 6/1973 Lutz et al. ...................... 296/222
4,159,144 A * 6/1979 Ehlen et al. .................... 296/222
4,412,404 A * 11/1983 Manning ............................ 52/19

FOREIGN PATENT DOCUMENTS

JP   2007-83941     4/2007
JP   2009-185845    8/2009
JP   2010-285124   12/2010

OTHER PUBLICATIONS

International Preliminary Report on Patentability in International Application No. PCT/JP2013/056441, Mailing date: Sep. 16, 2014.

*Primary Examiner* — Dennis H Pedder
(74) *Attorney, Agent, or Firm* — Finnegan, Henderson, Farabow, Garrett & Dunner, LLP

(57) ABSTRACT

A vehicle sunroof device has a contact portion between a panel bracket and a guide bracket, an insertion portion, a first member, and a second member. The contact portion contacts a first bracket, which is one of the panel bracket and the guide bracket. The insertion portion protrudes at the contact portion and is inserted into an attachment hole formed in a second bracket, which is the other of the panel bracket and the guide bracket. The first member has a retainer portion that permits a set range of motion of the second bracket. The second member is fastened to the first member. The first and second members permit relative motion of the first and second brackets in the non-fastened state, and restrict relative motion of the first and second brackets in the fastened state.

6 Claims, 10 Drawing Sheets

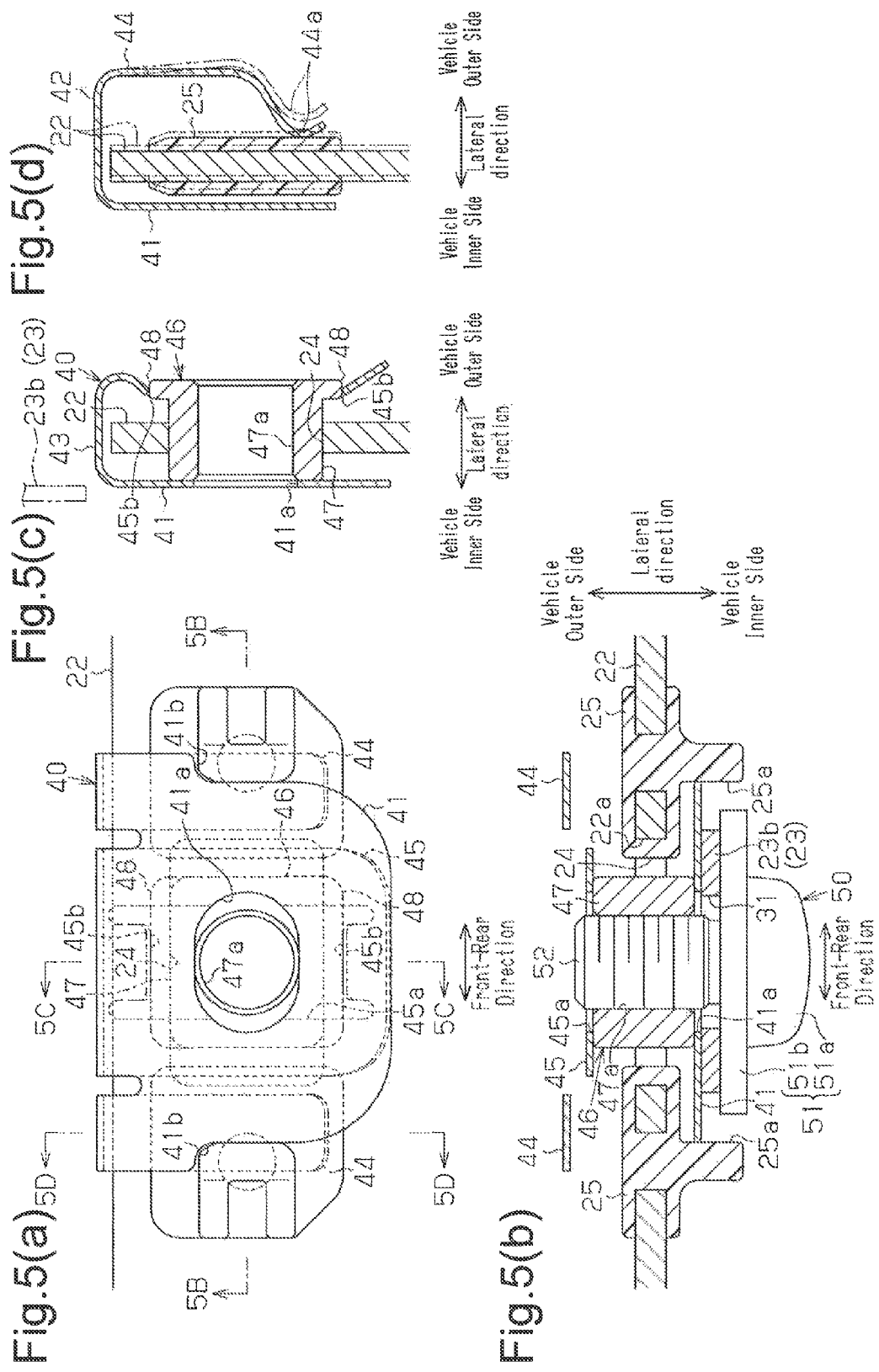

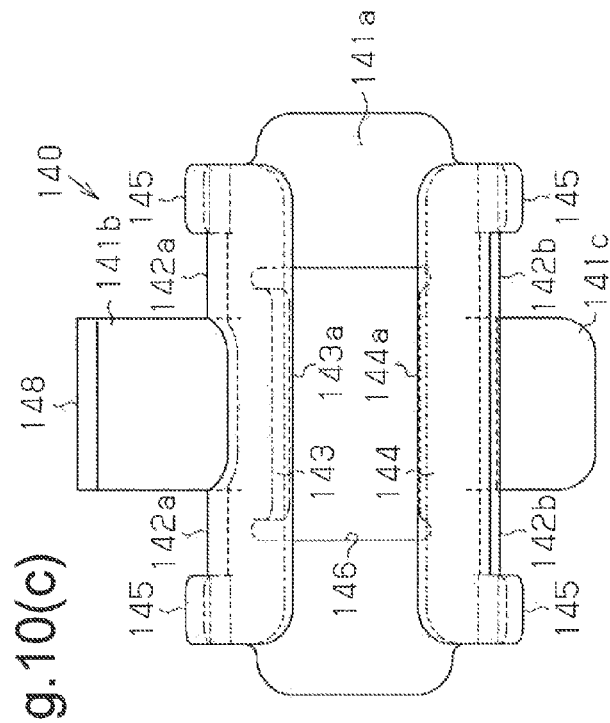
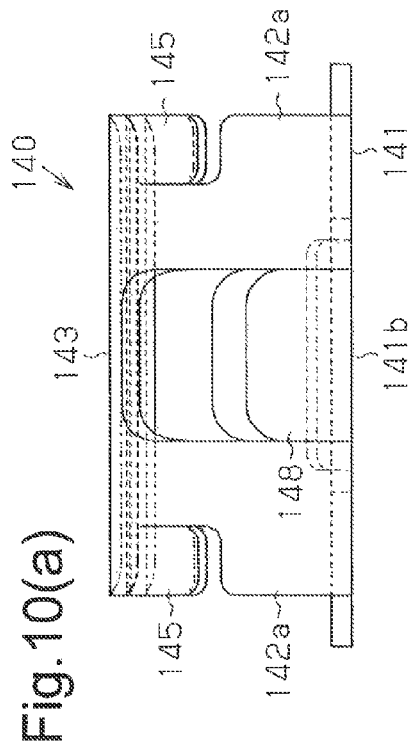
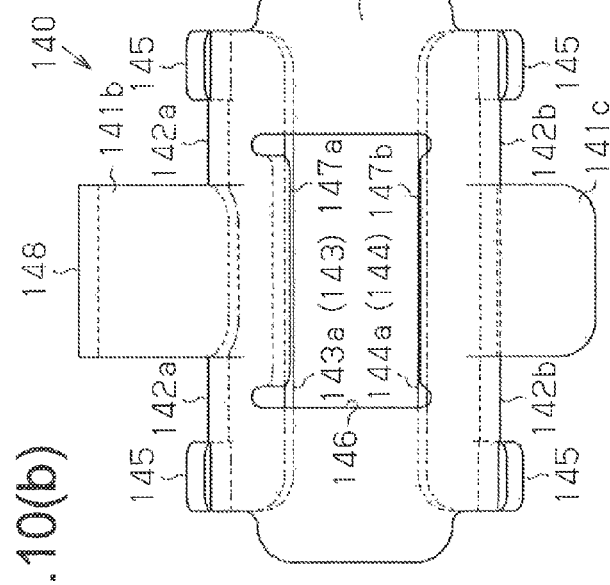

VEHICLE SUNROOF DEVICE

CROSS-REFERENCE TO RELATED APPLICATIONS

This application is a national phase application of International Application No. PCT/JP2013/056441, filed Mar. 8, 2013, and claims the priority of Japanese Application Nos. 2012-059012, filed Mar. 15, 2012, and 2012-059014, filed Mar. 15, 2012, the content of all of which is incorporated herein by reference.

TECHNICAL FIELD

The present invention relates to a vehicle sunroof device.

BACKGROUND ART

As a conventional sunroof device, a sunroof device described in Patent Document 1, for example, is known. As shown in FIG. 17, the vehicle sunroof device includes a first bracket 83 and a second bracket 85. The first bracket 83 is fixed to a movable panel 82 for selectively opening and closing an opening 81, which is formed in a roof portion 80 of a vehicle. The second bracket 85 is movably supported by a guide rail 84, which is arranged below the movable panel 82 and extends in the vehicle front-rear direction. The first bracket 83 and the second bracket 85 are opposed to each other in the vehicle lateral direction. The vehicle sunroof device also includes a screw member 86 and a nut member 87. The screw member 86 extends in the vehicle lateral direction and is inserted through the first bracket 83. The nut member 87 is engaged with the screw member 86 at a position between the first bracket 83 and the second bracket 85 in the vehicle lateral direction.

The nut member 87 is fixed to the first bracket 83 by clamping the first bracket 83 between a base portion 87a and a head portion 86a of the screw member 86, which is opposed to the first bracket 83, in the vehicle lateral direction as the screw member 86 is rotated. The nut member 87, which is fixed to the first bracket 83, is pressed against and held in contact with a top surface of the second bracket 85 with respect to a rotational direction of the screw member 86 at an engagement portion 87b, which extends from the base portion 87a in the vehicle lateral direction. This restricts pivot of the nut member 87 relative to the second bracket 85.

Also, the nut member 87, which is fixed to the first bracket 83, allows movement of the second bracket 85 relative to the first bracket 83 in the vehicle lateral direction at a position between a retainer portion 87c, which is arranged at the distal end of the nut member 87, and the base portion 87a. Accordingly, even when the position of the second bracket 85 relative to the first bracket 83 changes in the vehicle lateral direction, the nut member 87 absorbs such position change and supports the second bracket 85.

In this case, the position of the second bracket 85 relative to the first bracket 83 is adjustable in the vehicle lateral direction. This ensures reliable connection between the first bracket 83 and the second bracket 85 without increasing the dimension of the guide rail 84 in the vehicle lateral direction, for example.

PRIOR ART DOCUMENTS

Patent Document

Patent Document 1: Japanese Laid-Open Patent Publication No. 2007-83941

SUMMARY OF THE INVENTION

Problems that the Invention is to Solve

However, in the vehicle sunroof device described in Patent Document 1, the second bracket 85 is immovable relative to the first bracket 83 in the vehicle front-rear direction. Accordingly, to ensure connection between the first bracket 83 and the second bracket 85 even when the position of the second bracket 85 relative to the first bracket 83 changes in the vehicle front-rear direction, a shaft insertion hole 83a of the first bracket 83, through which the screw member 86 is inserted, must be enlarged in size in the vehicle front-rear direction, for example. This correspondingly increases the size of the head portion 86a (or the washer) of the screw member 86 and thus decreases ease of assembly and mountability in a vehicle.

Accordingly, it is an objective of the present invention to provide a vehicle sunroof device that ensures reliable connection between a first bracket fixed to a movable panel and a second bracket movably supported by a guide rail regardless of changes in the relative positions of the first bracket and the second bracket in a vehicle front-rear direction.

Means for Solving the Problems

To achieve the foregoing objective and in accordance with one aspect of the present invention, a vehicle sunroof device is provided that includes a movable panel adapted to selectively open and close an opening formed in a roof portion of a vehicle, a panel bracket adapted to be fixed to the movable panel, a guide rail adapted to extend in a vehicle front-rear direction at a position below the movable panel, a guide bracket adapted to be movably supported by the guide rail, a first member, and a second member. The guide bracket is opposed to the panel bracket in a vehicle lateral direction. The first member includes a contact portion, an insertion portion, and a retainer portion. The contact portion contacts a first bracket, which is one of the panel bracket and the guide bracket, at a position between the panel bracket and the guide bracket in the vehicle lateral direction. The insertion portion is projected from the contact portion in the vehicle lateral direction and inserted through an attachment hole formed in a second bracket that is the other one of the panel bracket and the guide bracket. The retainer portion is projected outward from a distal end portion of the insertion portion that extends through the attachment hole and engaged with an edge of the attachment hole to allow movement in the vehicle lateral direction of the second bracket within a certain range between the retainer portion and the contact portion. The second member includes a head portion that clamps the first bracket between the head portion and the contact portion and a shaft portion inserted through the first bracket in the vehicle lateral direction. The second member is fastened to the first member. The first member and the second member allow relative movement of the first bracket and the second bracket in the vehicle front-rear direction when held in a non-fastened state and restrict the relative movement of the first bracket and the second bracket in the vehicle front-rear direction when held in a fastened state.

In this configuration, by fastening the first member and the second member to each other, the first bracket, with which the contact portion is held in contact, is clamped between the first member and the second member (between the contact portion and the head portion) and fixed to the first member. On the other hand, the second bracket, in which the attachment hole is formed, is fixed to the first member in a state in which movement of the second bracket in the vehicle lateral direction is allowed within a certain range between the retainer portion, which is engaged with the edge of the attachment hole, and the contact portion. In this case, the relative positions of the first bracket and the second bracket are adjustable in the vehicle lateral direction. As a result, the first bracket and the second bracket are connected to each other with improved reliability.

At this stage, when the first member and the second member are in a non-fastened state, relative movement of the first bracket and the second bracket in the vehicle front-rear direction is allowed. Accordingly, even if the assembling positions of the first bracket and the second bracket are offset from each other in the vehicle front-rear direction, the first bracket and the second bracket are connected together with improved reliability by switching the first member and the second member from the non-fastened state to a fastened state while adjusting the relative positions of the first bracket and the second bracket in the vehicle front-rear direction. Then, when the first member and the second member are in the fastened state, the relative movement of the first bracket and the second bracket in the vehicle front-rear direction is restricted such that the first bracket and the second bracket are maintained at the adjusted relative positions in the vehicle front-rear direction.

The above described vehicle sunroof device preferably includes an urging member that urges the second bracket toward the contact portion in the vehicle lateral direction.

In this configuration, the second bracket urged by the urging member is held in contact with or arranged in the vicinity of the contact portion. Accordingly, when the first bracket is assembled in the up-down direction with the first member held in a state temporarily assembled to the second bracket, for example, the gap in the vehicle lateral direction is blocked such that the first bracket is unlikely to enter the gap between the second bracket and the contact portion. This improves ease of assembly.

In the above described vehicle sunroof device, the first member preferably includes a cover portion that is extended from the contact portion in the vehicle lateral direction and covers the second bracket.

In this configuration, when the first bracket is assembled in the up-down direction with the first member held in a state temporarily assembled to the second bracket, for example, the cover portion may be arranged in the assembling direction of the first bracket. This makes it unlikely that the first bracket will enter the gap between the second bracket and the contact portion or is mounted onto the second bracket. This improves ease of assembly.

In the above described vehicle sunroof device, the first member preferably includes an engagement portion that is engaged with the second bracket and restricts movement of the second bracket in the vehicle front-rear direction, and an insertion hole through which the shaft portion is inserted in the vehicle lateral direction is preferably formed in the contact portion and extends in the vehicle front-rear direction.

In this configuration, movement of the first member in the vehicle front-rear direction is restricted through engagement of the engagement portion with the second bracket. Also, when the shaft portion of the second member is inserted through the contact portion (the insertion hole) in the vehicle lateral direction to clamp the first bracket between the head portion and the contact portion, the position of the shaft portion is adjusted in the insertion hole in the vehicle front-rear direction. In this manner, by a significantly simple configuration including the engagement portion and the elongated insertion hole in combination, relative movement of the first bracket and the second bracket in the vehicle front-rear direction is selectively allowed and restricted by switching between the non-fastened state and the fastened state.

In the above described vehicle sunroof device, the first member preferably includes a nut member including the insertion portion loosely inserted through the attachment hole and the retainer portion and a holding member including, as the engagement portion, the contact portion engaged with an engagement projection projected from the second bracket in the vehicle lateral direction. The second member is configured to be fastened to the nut member and join the first bracket and the holding member together by jointly fastening the first bracket and the holding member.

In this configuration, the first member is divided into the holding member having the contact portion functioning as the engagement portion and the nut member fastened to the second member. Accordingly, optimal material can be employed for each of the components and reliability of each function can be improved. Particularly, the nut member, which is related to fastening with the second member, is not restricted by strength of the material of the contact portion (the holding member). This ensures desirable fastening strength between the nut member and the second member and, correspondingly, connection strength between the first bracket and the holding member (the contact portion). Further, since the contact portion is used also as the engagement portion, the number of components is decreased.

In the above described vehicle sunroof device, the engagement portion is preferably the insertion portion inserted through the attachment hole. The first member integrally preferably includes the contact portion, the insertion portion, the retainer portion, and a pair of flanges. The flanges are projected inward from a distal end portion of the first member extending through the attachment hole to be opposed to each other. The shaft portion of the second member is inserted between the flanges.

In this configuration, by fastening the first member and the second member to each other, the first bracket is clamped between the contact portion and the head portion and fixed to the first member. On the other hand, the insertion portion is inserted through the attachment hole with the two retainer portions elastically deforming. The retainer portions are thus passed through the attachment hole and engaged with corresponding edges of the attachment hole such that the second bracket is fixed to the first member. At this stage, the shaft portion of the second member is inserted between the two flanges. As a result, the starting point of elastic deformation of each retainer portion at the time when the retainer portion is passed through the attachment hole corresponds to the contact position between the corresponding flange and the shaft portion. This decreases the length of the moment of force related to the elastic deformation compared to, for example, a case in which the shaft portion of the second member is not inserted between the flanges. This decreases the elastic deformation of each retainer portion. The first member is thus unlikely to come off the second bracket. Correspondingly, likelihood that the first bracket and the second bracket are disconnected from each other is decreased.

In the above described vehicle sunroof device, the first member preferably includes the contact portion, the insertion portion loosely inserted through the attachment hole, and the retainer portion. The attachment hole has a plurality of stopping grooves arranged in the vehicle front-rear direction. The insertion portion has a stopping projection that is engaged with one of the stopping grooves in a rotational direction in which the second member is fastened.

In this configuration, by selecting one of the stopping grooves for engagement with the stopping projection formed in the insertion portion, the position of the insertion portion of the first member is adjusted in the vehicle front-rear direction. Also, by engaging the stopping projection with the selected stopping groove in the rotational direction in which the second member is fastened, movement of the insertion portion in the vehicle front-rear direction is restricted. In this manner, by a significantly simple configuration having the stopping grooves and the stopping projection combined together, relative movement of the first bracket and the second bracket in the vehicle front-rear direction is selectively allowed and restricted by switching between the non-fastened state and the fastened state.

In the above described vehicle sunroof device, the holding member preferably includes a support wall portion that clamps the nut member between the support wall portion and the contact portion in the vehicle lateral direction.

In this configuration, by assembling the holding member to the nut member having the insertion portion inserted through the attachment hole, for example, the nut member is clamped between the contact portion and the support wall portion in the vehicle lateral direction. In this manner, the nut member is temporarily fixed to the second bracket and ease of assembly is improved.

In the above described vehicle sunroof device, an engagement piece to be engaged with the retainer portion is preferably formed in the support wall portion.

In this configuration, by assembling the holding member to the nut member having the insertion portion inserted through the attachment hole, for example, the retainer portion and the engagement piece are engaged with each other. This stabilizes the posture of the nut member temporarily fixed to the second bracket, thus further improving ease of assembly.

Also, since the retainer portion is used also for engagement with the engagement piece, shape complication is avoided.

In the above described vehicle sunroof device, the first member and the second member are preferably fastened together by threading the nut member arranged in the contact portion onto the shaft member.

In this configuration, the first member and the second member are fastened to each other in the immediate proximity of the first bracket, which is clamped by the first member and the second member (the contact portion and the head portion). This fixes the first bracket with increased firmness.

In the above described vehicle sunroof device, a distal-side internal threaded portion to be threaded onto the shaft portion is preferably formed in each of the flanges.

In this configuration, through threading between the distal-side internal threaded portion of each flange and the shaft portion, the pull amount of the distal-side internal threaded portion toward the head portion is adjusted in correspondence with the fastening amount (the rotation amount) of the shaft portion (the second member). This allows adjustment of the outward projecting length (the retainer length) of each retainer portion, which is correlated with the pull amount. As a result, the engagement amount between each retainer portion and the corresponding edge of the attachment hole is adjusted.

In the above described vehicle sunroof device, the nut member is preferably an internal threaded portion cut and raised in the contact portion.

In this configuration, the nut member is the internal threaded portion cut and raised in the contact portion. This decreases the number of components compared to, for example, a case in which the nut member is arranged separately from the contact portion.

In the above described vehicle sunroof device, the nut member preferably includes a plate member having the contact portion, and a nut body that is assembled to the plate member and integrally includes the insertion portion and the retainer portion.

In this configuration, to fix the other one of the first bracket in which the attachment hole is formed and the second bracket to the nut member, the plate member is connected to the nut body with the insertion portion of the nut body loosely inserted through the attachment hole in advance. Such fixation is thus accomplished smoothly.

To achieve the foregoing objective and in accordance with one aspect of the present invention, a vehicle sunroof device is provided that includes a movable panel for selectively opening and closing an opening formed in a roof portion of a vehicle, a panel bracket fixed to the movable panel, a guide rail extending in a vehicle front-rear direction at a position below the movable panel, a guide bracket that is movably supported by the guide rail and is opposed to the panel bracket in a vehicle lateral direction, an attachment member, and a screw member. The attachment member integrally includes a contact portion, an insertion portion, flanges, and a retainer portion. The contact portion contacts a first bracket, which is one of the panel bracket and the guide bracket, at a position between the panel bracket and the guide bracket in the vehicle lateral direction. The insertion portion is projected from the contact portion in the vehicle lateral direction and inserted through an attachment hole formed in a second bracket that is the other one of the panel bracket and the guide bracket. The flanges are projected inward from a distal end portion of the insertion portion extending through the attachment hole to be opposed to each other. The retainer portion is projected outward from the distal end portion of the insertion portion that extends through the attachment hole and engaged with an edge of the attachment hole to allow movement in the vehicle lateral direction of the second bracket between the retainer portion and the contact portion. The screw member has a head portion that clamps the first bracket between the head portion and the contact portion and a shaft portion inserted through the first bracket in the vehicle lateral direction. The screw member is fastened to the attachment member, and the shaft portion is inserted between the flanges.

In this configuration, by fastening the attachment member and the screw member to each other, the first bracket with which the contact portion is held in contact is clamped between the contact portion and the head portion and fixed to the attachment member. On the other hand, the insertion portion is inserted through the attachment hole with the two retainer portions elastically deforming. The retainer portions are thus passed through the attachment hole and engaged with corresponding edges of the attachment hole such that the second bracket having the attachment hole is fixed to the attachment member. Movement of the second bracket in the vehicle lateral direction is allowed within a range between the contact portion and each retainer portion. In this case, the relative positions of the first bracket and the second bracket are adjustable in the vehicle lateral direction. As a result, the first bracket and the second bracket are connected to each other with improved reliability.

Particularly, the shaft portion of the screw member is inserted through the flanges. The starting point of elastic deformation of each retainer portion when the retainer portion is passed through the attachment hole corresponds to the contact position between the corresponding flange and the shaft portion. This decreases the length of the moment of force related to the elastic deformation compared to, for example, a case in which the shaft portion of the screw member is not inserted between the flanges. The elastic deformation of each retainer portion is thus decreased. This makes it unlikely that the attachment member will come off the second bracket, thus decreasing likelihood that the first bracket and the second bracket are disconnected from each other.

Also, when the insertion hole is an elongated hole through which the shaft portion is loosely inserted in the vehicle front-rear direction, the position of the shaft portion is adjusted within the range corresponding to the insertion hole (the elongated hole) in the vehicle front-rear direction when the shaft portion is inserted through the insertion hole of the contact portion. The dimension of the shaft insertion hole formed in the first bracket through which the shaft portion is inserted is thus decreased in the vehicle front-rear direction.

To achieve the foregoing objective and in accordance with one aspect of the present invention, a vehicle sunroof device is provided that includes a movable panel for selectively opening and closing an opening formed in a roof portion of a vehicle, a panel bracket fixed to the movable panel, a guide rail extending in a vehicle front-rear direction at a position below the movable panel, a guide bracket that is movably supported by the guide rail and is opposed to the panel bracket in a vehicle lateral direction, a nut member, and a screw member. The nut member includes a contact portion, an insertion portion, a retainer portion. The contact portion contacts a first bracket, which is one of the panel bracket and the guide bracket, at a position between the panel bracket and the guide bracket in the vehicle lateral direction. The insertion portion is projected from the contact portion in the vehicle lateral direction and loosely inserted through an attachment hole formed in a second bracket that is the other one of the panel bracket and the guide bracket. The retainer portion that is formed in a distal end portion of the insertion portion that extends through the attachment hole and engaged with an edge of the attachment hole to allow movement in the vehicle lateral direction of the second bracket between the retainer portion and the contact portion. The screw member is inserted through the first bracket in the vehicle lateral direction and fastened to the nut member. The attachment hole has a plurality of stopping grooves arranged in the vehicle front-rear direction. The insertion portion has a stopping projection that is engaged with one of the stopping grooves in a rotational direction in which the screw member is fastened.

In this configuration, by fastening the nut member and the screw member to each other, the first bracket is clamped between the nut member and the screw member (the contact portion and the head portion) and fixed to the nut member. On the other hand, the second bracket is fixed to the nut member in a state in which movement of the second bracket in the vehicle lateral direction is allowed within a range between each retainer portion, which is engaged with the corresponding edge of the attachment hole, and the contact portion. In this case, the relative positions of the first bracket and the second bracket are adjustable in the vehicle lateral direction. As a result, the first bracket and the second bracket are connected to each other with improved reliability.

At this stage, by selecting one of the stopping grooves for engagement with the stopping projection formed in the insertion portion, the position of the insertion portion is adjusted in the vehicle front-rear direction. Also, by engaging the stopping projection with the selected stopping groove in the rotational direction in which the screw member is fastened, movement of the insertion portion in the vehicle front-rear direction is stopped. In this manner, the relative positions of the first bracket and the second bracket are adjustable in the vehicle front-rear direction such that the first bracket and the second bracket are connected to each other with improved reliability. Also, the dimension of the shaft insertion hole through which the screw member is inserted that is formed in one of the first bracket, with which the contact portion is held in contact, and the second bracket is decreased in the vehicle front-rear direction. The dimension of the head portion or the washer of the screw member is thus decreased correspondingly. This improves ease of assembly and mountability in a vehicle.

Effects of the Invention

According to the present invention, a panel bracket fixed to a movable panel, and a guide bracket movably supported by a guide rail are reliably connected to each other regardless of changes in the relative positions of the panel bracket and the guide bracket in the vehicle front-rear direction.

BRIEF DESCRIPTION OF THE DRAWINGS

FIG. 5(a) is a side view showing a holding member and other member assembled to a functional bracket as viewed from inside in the vehicle lateral direction;

FIG. 5(b) is a cross-sectional view taken along line 5B-5B of FIG. 5(a);

FIG. 5 (c) is a cross-sectional view taken along line 5C-5C of FIG. 5(a);

FIG. 5(d) is a cross-sectional view taken along line 5D-5D of FIG. 5(a);

FIG. 10(a) is a plan view showing an attachment member;

FIG. 10(b) is a side view showing the attachment member as viewed from inside in the vehicle lateral direction;

FIG. 10(c) is a side view showing the attachment member as viewed from outside in the vehicle lateral direction;

MODES FOR CARRYING OUT THE INVENTION

First Embodiment

A vehicle sunroof device according to a first embodiment will now be described with reference to FIGS. 1 to 6. In the description below, a vehicle front-rear direction will be referred to as "a front-rear direction". An upper side and a lower side in a vehicle height direction will be referred to as "an upper side" and "a lower side", respectively. An inner side in a vehicle lateral direction, which is inward with respect to the vehicle passenger compartment, will be referred to as "a vehicle inner side" and an outer side in the vehicle lateral direction, which is outward with respect to the vehicle passenger compartment, will be referred to as "a vehicle outer side".

Figure 1:
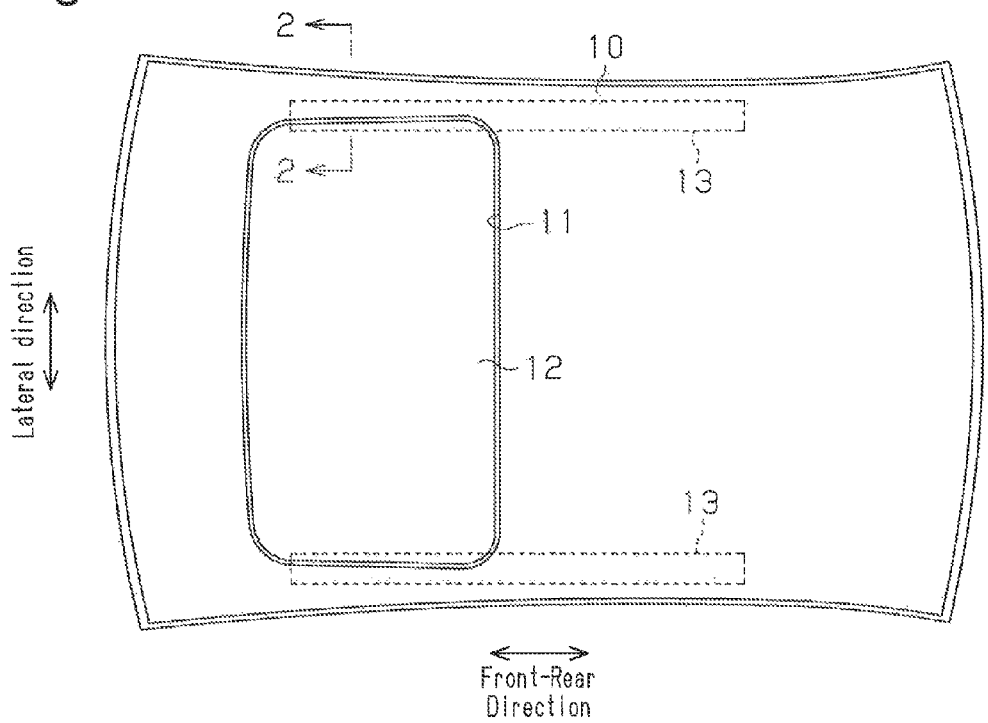
FIG. 1 is a plan view showing a vehicle in which a first embodiment of the present invention is employed.

As illustrated in FIG. 1, a roof portion 10 of a vehicle such as an automobile includes a substantially rectangular opening 11 and a substantially rectangular movable panel 12, which is configured by, for example, a glass plate. A pair of guide rails 13, each of which is configured by, for example, an aluminum alloy extrusion product, extend in the front-rear directions in opposite edges of the opening 11 in a vehicle lateral direction, which are located below the movable panel 12 (the far side of the sheet of FIG. 1 from the viewer).

Support structures of the movable panel 12 will hereafter be described. The support structures of the movable panel 12 are configured basically symmetrical in the vehicle lateral direction (in the left-right direction). Accordingly, the description below is focused on the support structure on one side in the vehicle lateral direction.

Figure 2:
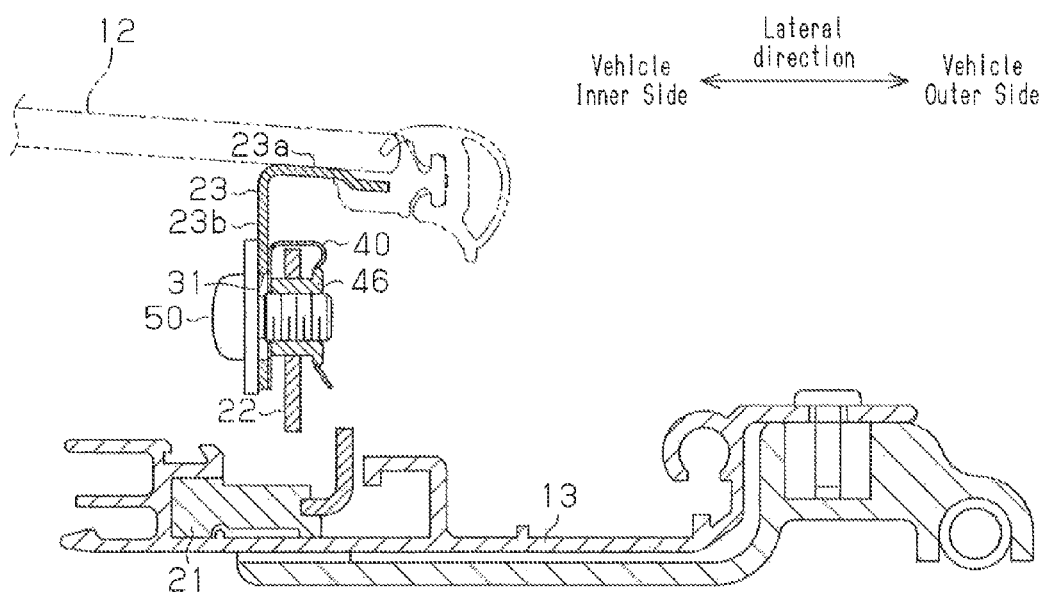
FIG. 2 is a cross-sectional view taken along line 2-2 of FIG. 1.

With reference to FIG. 2, a sliding member 21 is supported by each of the guide rails 13 in a manner slidable in the front-rear direction (the direction perpendicular to the sheet surface of FIG. 2). The sliding member 21 pivotally supports a front end portion of a functional bracket 22 serving as a guide bracket, which is upright in the vehicle height direction, extends in the front-rear direction, and is configured by, for example, a metal plate. In other words, the functional bracket 22 is movably supported by the guide rail 13 through the sliding member 21.

A rear end portion of the functional bracket 22 is linked to an appropriate rear shoe (not shown), which is supported in a manner slidable in the guide rail 13 in the front-rear direction (description of the manner in which the functional bracket 22 and the rear shoe are linked to each other is omitted herein). The rear shoe is driven by a drive unit (for example, a motor (not shown)) to move in the front-rear direction. Movement of the rear shoe in the front-rear direction either pivots the functional bracket 22 about the front end portion of the functional bracket 22 as the fulcrum in the vehicle height direction or moves the functional bracket 22 in the guide rail 13 in the front-rear direction.

A panel bracket 23, which is configured by, for example, a metal plate, is attached to a bottom surface of the movable panel 12. The panel bracket 23 includes a fixed portion 23a, which is held in contact with the bottom surface of the movable panel 12, and an attachment portion 23b, which extends downward from the vehicle inner side end of the fixed portion 23a, and is formed substantially in an L shape. The attachment portion 23b is opposed to the functional bracket 22 in the vehicle lateral direction at the vehicle inner side of the functional bracket 22. One of the functional bracket 22 and the panel bracket 23 is a first bracket and the other one of the functional bracket 22 and the panel bracket 23 is a second bracket.

The connection structure of the functional bracket 22 and the panel bracket 23 will hereafter be described.

Figure 3:
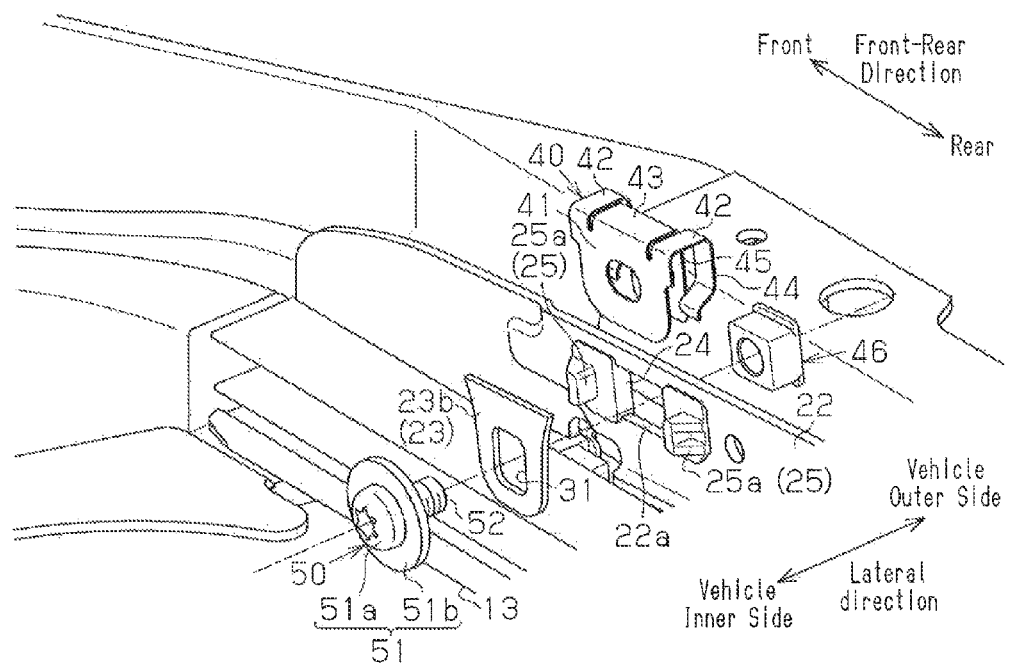
FIG. 3 is an exploded perspective view showing the first embodiment.
Figure 4A:
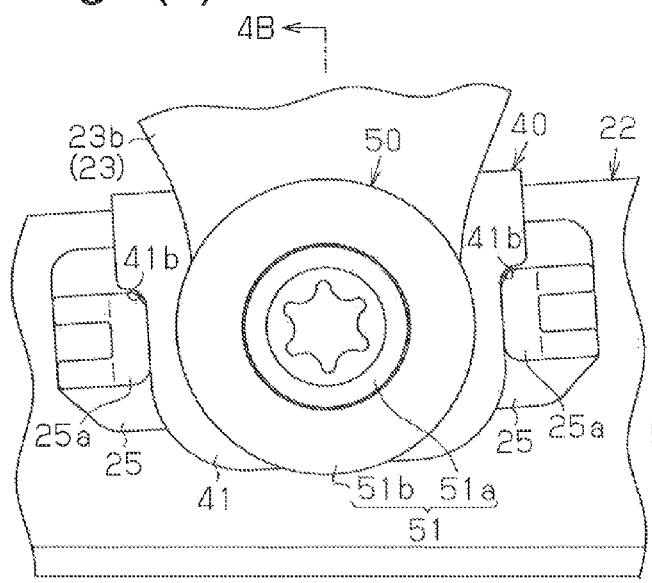
FIG. 4(a) is a side view showing the first embodiment as viewed from inside in the vehicle lateral direction.
Figure 4B:
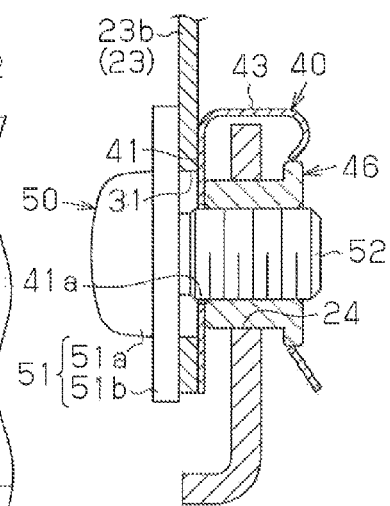
FIG. 4 (b) is a cross-sectional view taken along line 4B-4B of FIG. 4(a)

With reference to FIGS. 3 and 4, a through hole 22a opened in the vehicle lateral direction is formed in the functional bracket 22. Molded bodies 25 formed of plastic, for example, are formed integrally with opposite edges of the through hole 22a in the front-rear direction. The through hole 22a forms an attachment hole 24 at a position between the two molded bodies 25. The attachment hole 24 has a substantially rectangular shape extending in the front-rear direction. Each of the molded bodies 25 includes a substantially claw-like projecting portion 25a serving as an engagement projection, which projects to the vehicle inner side such that the opposed sides of the molded bodies 25 extend substantially parallel to each other in the front-rear direction.

A shaft insertion hole 31 opened in the vehicle lateral direction is formed in the panel bracket 23. The shaft insertion hole 31 has a substantially rectangular shape extending in the vehicle height direction. The opening width of the shaft insertion hole 31 is slightly greater than the opening width of the attachment hole 24 in the vehicle height direction and smaller than the opening width of the attachment hole 24 (the distance between the two molded bodies 25) in the front-rear direction. The shaft insertion hole 31 is opposed to the attachment hole 24 in the vehicle lateral direction such that the shaft insertion hole 31 is substantially arranged within the range corresponding to the attachment hole 24.

A holding member 40, which is configured by, for example, a metal plate, is supported by the functional bracket 22. As illustrated in FIGS. 5(a) to 5(d), the holding member 40 includes a contact portion 41 having a substantially rectangular shape with a dimension in the vehicle height direction greater than the distance between an upper edge of the functional bracket 22 and a lower edge of the attachment hole 24 in the vehicle height direction. The contact portion 41 has a lower portion that is reduced in size in the front-rear direction with respect to a pair of front and rear stepped portions 41b, which are formed in a middle portion of the contact portion 41 in the vehicle height direction. The dimension of the lower portion in the front-rear direction is substantially equal to the distance between the two projecting portions 25a in the front-rear direction and set to a value greater than the opening width of the attachment hole 24 in the front-rear direction.

The contact portion 41 contacts the panel bracket 23 at a position between the functional bracket 22 and the panel bracket 23 in the vehicle lateral direction. At this stage, the lower portion of the contact portion 41 is engaged with the functional bracket 22 (the projecting portions 25a) such that the two stepped portions 41b are mounted on the corresponding projecting portions 25a. In other words, the contact portion 41 functions also as an engagement portion that restricts movement of the holding member 40 relative to the functional bracket 22 in the front-rear direction. Also, since the stepped portions 41b are mounted on the projecting portions 25a, the contact portion 41 also restricts downward movement of the holding member 40 relative to the functional bracket 22. A substantially oval insertion hole 41a, which is opened in the vehicle lateral direction and extends in the front-rear direction, is formed in a middle portion of the contact portion 41. When the contact portion 41 is engaged with the holding member 40, the insertion hole 41a is opposed to a middle portion of the attachment hole 24 in the vehicle lateral direction.

Figure 6A:
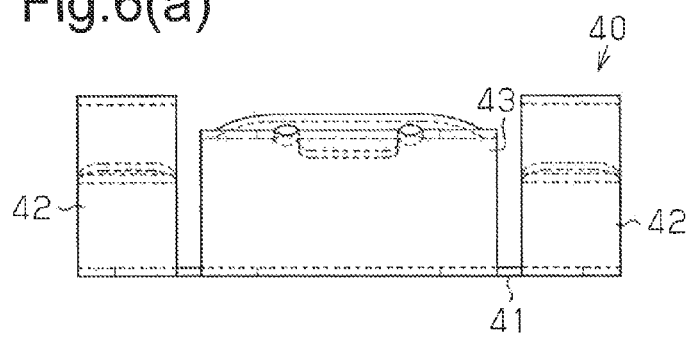
FIG. 6(a) is a plan view showing the holding member.
Figure 6B:
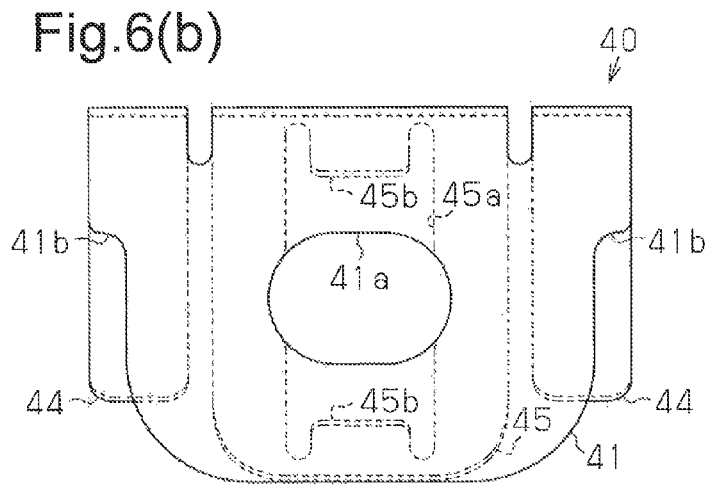
FIG. 6(b) is a side view showing the holding member as viewed from inside in the vehicle lateral direction.
Figure 6C:
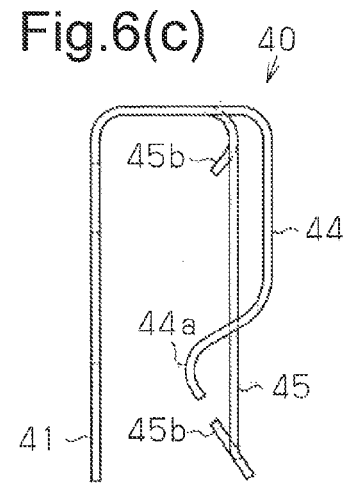
FIG. 6(c) is a front view showing the holding member as viewed from a rear position of the vehicle.

With reference to FIGS. 6(a) to 6(c), the holding member 40 includes a pair of first cover portions 42 extending from opposite end portions of an upper edge of the contact portion 41 in the front-rear direction toward the vehicle outer side. The holding member 40 includes a second cover portion 43 extending from a middle portion of the contact portion 41 in the front-rear direction, which is arranged between the two first cover portions 42 of the upper edges of the contact portion 41, toward the vehicle outer side. The extending length of each of the first cover portions 42 toward the vehicle outer side is set to a value greater than the extending length of the second cover portion 43 toward the vehicle outer side. The extending length of the second cover portion 43 toward the vehicle outer side is set to a value greater than the thickness of the functional bracket 22 at the attachment hole 24. When the contact portion 41 is engaged with the holding member 40, the two first cover portions 42 and the second cover portion 43 are located above the upper edge of the functional bracket 22. That is, the first cover portions 42 and the second cover portion 43 are located in the vicinity of the functional bracket 22 and cover an upper portion of the functional bracket 22. The first cover portions 42 and the second cover portion 43 each configure a cover portion.

The holding member 40 includes a pair of elastic wall portions 44, each of which extends downward from the vehicle outer side end of the associated one of the two first cover portions 42. The holding member 40 also has a support wall portion 45 extending downward from the vehicle outer side end of the second cover portion 43. The downward extending length of the support wall portion 45 is substantially equal to the downward extending length of the contact portion 41 and set to a value greater than the downward extending length of each of the elastic wall portions 44. A lower end portion of each elastic wall portion 44 is curved toward the vehicle inner side and forms an elastic piece 44a.

A substantially rectangular support hole 45a, which is opened in the vehicle lateral direction and extends in the vehicle height direction, is formed in a middle portion of the support wall portion 45. The center of the support hole 45a substantially coincides with the insertion hole 41a. Opposite edges of the support hole 45a in the vehicle height direction are cut and raised toward the vehicle inner side to form engagement pieces 45b as the edges approach each other in the vehicle height direction.

As illustrated in FIGS. 5(a) to 5(d), the holding member 40 supports a nut member 46. That is, the nut member 46 has a substantially rectangular column-like insertion portion 47, which has a dimension in the vehicle height direction that is substantially equal to the opening width of the attachment hole 24 in the vehicle height direction. The nut member 46 also includes a pair of flange-like retainer portions 48, which extend from an upper edge and a lower edge of the vehicle outer side end of the insertion portion 47 and extend in the vehicle height direction in a manner separating from each other. A threaded hole 47a, which has an inner diameter substantially equal to the opening width of the insertion hole 41a in the vehicle height direction and is opened in the vehicle lateral direction, is formed in the insertion portion 47. The axial length of the insertion portion 47 is set to a value substantially equal to the distance between the contact portion 41 and the support wall portion 45 (the engagement piece 45b) in the vehicle lateral direction. The distance between the two retainer portions 48 in the vehicle height direction is set to a value substantially equal to the distance between the two engagement pieces 45b in the vehicle height direction. With the insertion portion 47 inserted through and supported by the attachment hole 24, the nut member 46 is clamped between the contact portion 41 and the support wall portion 45 of the holding member 40, which is assembled from above. In this manner, the vehicle inner side end of the insertion portion 47 contacts the contact portion 41 and opposite edges of the vehicle outer side end of the insertion portion 47 in the front-rear direction contact opposite edges of the support hole 45a in the front-rear direction. In this state, the two retainer portions 48 are engaged with the corresponding engagement pieces 45b such that the nut member 46 is supported by the holding member 40. The holding member 40 and the nut member 46 configure a first member.

The contact portion 41 and the two retainer portions 48 are located at the vehicle inner side and the vehicle outer side, respectively, with the functional bracket 22 arranged between the contact portion 41 and the retainer portions 48. The holding member 40 and the nut member 46 are supported by the functional bracket 22 with the functional bracket 22 clamped between the contact portion 41 and the two retainer portions 48 in the vehicle lateral direction. In other words, through engagement between the contact portion 41 or the retainer portions 48 with the opposed edges of the attachment hole 24, movement of the holding member 40 and the nut member 46 in the vehicle lateral direction is restricted. In other words, the position of the functional bracket 22 is adjustable relative to the holding member 40 in the range between the contact portion 41 and each retainer portion 48 in the vehicle lateral direction.

As illustrated in FIG. 5(d), the elastic wall portion 44 extending downward from each first cover portion 42 is pressed against and held in contact with a vehicle outer side surface of the functional bracket 22 through the corresponding molded body 25. This constantly urges the functional bracket 22 toward the contact portion 41 in the vehicle lateral direction.

The nut member 46, which is supported by the support wall portion 45, is movable in the front-rear direction within the range corresponding to the support hole 45a and the attachment hole 24 with the two retainer portions 48 sliding on the engagement pieces 45b. At this stage, the threaded hole 47a of the nut member 46 (the insertion portion 47) is also moved in the front-rear direction. However, the insertion hole 41a of the contact portion 41 is capable of opening the threaded hole 47a in the vehicle lateral direction within the range of the insertion hole 41a in the front-rear direction. In other words, even when the nut member 46 moves relative to the functional bracket 22 (the attachment hole 24) and the holding member 40 in the front-rear direction, the threaded hole 47a as a whole is open in the vehicle lateral direction within the range of the insertion hole 41a in the front-rear direction.

With reference to FIGS. 4 and 5(c), the panel bracket 23, which is assembled to the vehicle inner side surface of the contact portion 41 from above, contacts the contact portion 41 of the holding member 40, which is supported by the functional bracket 22 together with the nut member 46. At this stage, the center of the shaft insertion hole 31 of the panel bracket 23 and the center of the insertion hole 41a substantially coincide with each other in the vehicle height direction.

A screw member 50, which serves as a second member and is fastened to the nut member 46, is inserted through the shaft insertion hole 31. That is, the screw member 50 is formed of metal material, for example, and includes a head portion 51 and a shaft portion 52 having an axis extending from the head portion 51 in the vehicle lateral direction as an integral body. The head portion 51 is arranged coaxially with the shaft portion 52. The head portion 51 includes a substantially pot-shaped thread head 51a, which has a substantially star-shaped groove, and a substantially annular washer portion 51b. The washer portion 51b projects from a distal end of the thread head 51a at the side corresponding to the shaft portion 52 radially about the center line of the thread head 51a. The outer diameter of the washer portion 51b is set to a value greater than the maximum opening width of the shaft insertion hole 31.

The shaft portion 52 has a thread. The screw member 50 is fastened to the nut member 46 by threading the shaft portion 52, which is loosely inserted through the shaft insertion hole 31 of the panel bracket 23 and the insertion hole 41a of the holding member 40 (the contact portion 41) sequentially from the vehicle inner side, onto the threaded hole 47a of the nut member 46.

Specifically, when the screw member 50 is loosely fastened (hereinafter, referred to also as "a non-fastened state"), relative movement of the functional bracket 22 and the panel bracket 23 in the front-rear direction is allowed by moving the nut member 46, together with the screw member 50, relative to the holding member 40 and the functional bracket 22 in the front-rear direction. That is, the shaft portion 52 (the screw member 50) inserted through the shaft insertion hole 31 can be threaded into the threaded hole 47a of the nut member 46 at any position in the extending range of the insertion hole 41a in the front-rear direction. This allows adjustment of the position of the shaft portion 52 in the attachment hole 24 in the front-rear direction. The relative positions of the functional bracket 22 and the panel bracket 23 in the front-rear direction thus become adjustable.

In contrast, when the screw member 50 is firmly fastened (hereinafter, referred to also as a "fastened state"), the panel bracket 23 and the holding member 40 (the contact portion 41) are assembled to each other by jointly fastening the panel bracket 23 and the holding member 40 with the screw member 50 and the nut member 46. In other words, the contact portion 41 of the holding member 40 and the head portion 51 (the washer portion 51b) of the screw member 50 are held in contact with the panel bracket 23. The panel bracket 23 is thus clamped between these components (between the contact portion 41 and the head portion 51) by axial, force and firmly fixed to the holding member 40. This restricts relative movement of the functional bracket 22, the two projecting portions 25a of which are engaged with the holding member 40 (the contact portion 41), and the panel bracket 23 in the front-rear direction at predetermined relative positions.

In this manner, the panel bracket 23, which is connected to the functional bracket 22 through the holding member 40, the nut member 46, and the screw member 50, moves integrally with the functional bracket 22, together with the movable panel 12 supported by the panel bracket 23. When the functional bracket 22 pivots relative to the sliding member 21 or moves in the guide rail 13 in the front-rear direction together with the sliding member 21, the movable panel 12, which is supported by the panel bracket 23, selectively opens and closes the opening 11. Particularly, the movable panel 12 is allowed to move, together with the panel bracket 23, relative to the functional bracket 22 (and the guide rail 13) in a certain range in the vehicle lateral direction. This reduces the influence of variations during manufacture and assembly so that the opening 11 is closed with improved reliability.

Operation of the present embodiment will hereafter be described.

By fastening the screw member 50 to the nut member 46, which is supported by the holding member 40 and the like, the panel bracket 23 is clamped between the holding member 40 and the screw member 50 (between the contact portion 41 and the head portion 51) by axial force and thus firmly fixed to the holding member 40. The functional bracket 22 is fixed to the holding member 40 and the like in a state allowed to move within a certain range between the two retainer portions 48, which are engaged with the corresponding edges of the attachment hole 24, and the contact portion 41 in the vehicle lateral direction. In this case, the relative positions of the panel bracket 23 and the functional bracket 22 are adjustable in the vehicle lateral direction. As a result, the panel bracket 23 and the functional bracket 22 are connected to each other with improved reliability.

When the nut member 46 and the screw member 50 are fastened to each other, the position of the shaft portion 52 (the screw member 50) inserted through the shaft insertion hole 31 is adjustable relative to the insertion hole 41a of the holding member 40, the contact portion 41 of which is engaged with the two projecting portions 25a, in the extending range of the insertion hole 41a in the front-rear direction. This allows adjustment of the relative positions of the functional bracket 22 and the panel bracket 23 in the front-rear direction. Then, the screw member 50 is fastened to the nut member 46 with the functional bracket 22 and the panel bracket 23 located at predetermined relative positions in the front-rear direction. This fixes the functional bracket 22 to the panel bracket 23 at the predetermined relative position. In this manner, the relative positions of the panel bracket 23 and the functional bracket 22 are adjustable in the front-rear direction. This ensures connection between the panel bracket 23 and the functional bracket 22 with improved reliability. Also, since the relative positions of the panel bracket 23 and the functional bracket 22 are adjustable in the front-rear direction, assembly accuracy of the panel bracket 23 and the functional bracket 22 required in the front-rear direction is decreased such that the opening width of the shaft insertion hole 31 of the panel bracket 23 in the front-rear direction is reduced.

An assembling method of the present embodiment will hereafter be described.

With reference to FIGS. 3 to 5, when the holding member 40 and the like are fixed to the functional bracket 22, the insertion portion 47 of the nut member 46 is inserted through the attachment hole 24 of the functional bracket 22 from the vehicle outer side such that the nut member 46 is supported by the functional bracket 22. In this state, the holding member 40 is assembled from above the functional bracket 22. Then, while causing the contact portion 41 and the support wall portion 45 to slide on the nut member 46, the nut member 46 is clamped between the contact portion 41 and the support wall portion 45. In this manner, the vehicle inner side end of the insertion portion 47 is brought into contact with the contact portion 41 and the opposite edges of the vehicle outer side end of the insertion portion 47 in the front-rear direction are brought into contact with the opposite edges of the support hole 45a in the front-rear direction. In this state, the two retainer portions 48 are engaged with the corresponding engagement pieces 45b such that the nut member 46 is supported by the holding member 40.

At this stage, the holding member 40 is immovable relative to the functional bracket 22 in the front-rear direction. However, the nut member 46 is movable relative to the functional bracket 22 in the front-rear direction with the two retainer portions 48 sliding on the corresponding engagement pieces 45b.

In the above-described manner, the holding member 40 is fixed to the functional bracket 22 in a temporarily assembled state. At this stage, the functional bracket 22, which is urged toward the vehicle inner side by the two elastic wall portions 44 (the elastic pieces 44a), is held in contact with or arranged in the vicinity of the contact portion 41. An upper portion of the functional bracket 22 is covered by the first cover portions 42 and the second cover portion 43.

Subsequently, the panel bracket 23 is provided from above the holding member 40 and caused to contact the vehicle inner side surface of the contact portion 41. At this stage, since the two first cover portions 42 and the second cover portion 43 are arranged in the assembling direction of the panel bracket 23, it is unlikely that the panel bracket 23 will erroneously enter the gap between the contact portion 41 and the functional bracket 22 or is mounted on the functional bracket 22. The functional bracket 22, which is urged toward the vehicle inner side by the two elastic wall portions 44 (the elastic pieces 44a), is held in contact with or arranged in the vicinity of the contact portion 41. The gap in the vehicle lateral direction is thus closed to make it unlikely that the panel bracket 23 will erroneously enter the gap between the contact portion 41 and the functional bracket 22.

Afterwards, the panel bracket 23 is arranged such that the position of the center of the shaft insertion hole 31 of the panel bracket 23 and the position of the center of the insertion hole 41a in the vehicle height direction substantially coincide with each other. In this state, the position of the nut member 46 in the front-rear direction is adjusted with the two retainer portions 48 sliding on the corresponding engagement pieces 45b in correspondence with the relative positions of the shaft insertion hole 31 of the panel bracket 23 and the insertion hole 41a of the holding member 40 (which is, the attachment hole 24 of the functional bracket 22) in the front-rear direction. Then, the shaft portion 52 of the screw member 50 is loosely inserted through the shaft insertion hole 31 of the panel bracket 23 from the vehicle inner side. The shaft portion 52 is then threaded onto the threaded hole 47a and the screw member 50 and the nut member 46 are fastened together. This fixes the functional bracket 22 to the panel bracket 23 at the adjusted position. After the screw member 50 and the nut member 46 are fastened together, movement of the shaft portion 52 in the insertion hole 41a in the front-rear direction is restricted. As a result, the relative positions of the panel bracket 23 and the functional bracket 22 in the front-rear direction are fixed.

In the above-described manner, the functional bracket 22 and the panel bracket 23 are connected to each other through the holding member 40, the nut member 46, and the screw member 50.

As has been described in detail, the present embodiment has the advantages described below.

(1) In the present embodiment, the relative positions of the panel bracket 23 and the functional bracket 22 are adjustable in the vehicle lateral direction. As a result, the panel bracket 23 and the functional bracket 22 are connected to each other with improved reliability.

When the nut member 46 and the screw member 50 are in the non-fastened state, relative movement of the panel bracket 23 and the functional bracket 22 in the front-rear direction is allowed. Accordingly, even when the assembling position of the panel bracket 23 and the assembling position of the functional bracket 22 are displaced from each other in the front-rear direction, for example, the panel bracket 23 and the functional bracket 22 are connected together with improved reliability by switching the nut member 46 and the screw member 50 from the non-fastened state to the fastened state while adjusting the relative positions of the panel bracket 23 and the functional bracket 22 in the front-rear direction. When the nut member 46 and the screw member 50 are in the fastened state, relative movement of the panel bracket 23 and the functional bracket 22 in the front-rear direction is restricted such that the panel bracket 23 and the functional bracket 22 are maintained at the adjusted relative positions in the front-rear direction.

(2) In the present embodiment, the functional bracket 22, which is urged by the two elastic pieces 44a, is held in contact with or arranged in the vicinity of the contact portion 41. Accordingly, when the panel bracket 23 is assembled in the up-down direction with the holding member 40 held in the state temporarily assembled to the functional bracket 22, for example, the gap in the vehicle lateral direction is closed such that the panel bracket 23 is unlikely to enter the gap between the functional bracket 22 and the contact portion 41. This improves ease of assembly.

The two elastic pieces 44a decrease vibration of the functional bracket 22 in the vehicle lateral direction and reduce noise caused by such vibration.

(3) in the present embodiment, when the panel bracket 23 is assembled in the up-down direction with the holding member 40 held in the state temporarily assembled to the functional bracket 22, for example, the first cover portions 42 and the second cover portion 43 are arranged in the assembling direction of the panel bracket 23. As a result, the panel bracket 23 is unlikely to enter the gap between the functional bracket 22 and the contact portion 41 or be mounted on the functional bracket 22 and is guided to the vehicle inner side with respect to the contact portion 41. This improves ease of assembly.

(4) In the present embodiment, movement of the holding member 40 in the front-rear direction is restricted through engagement of the contact portion 41 with the functional bracket 22 (the two projecting portions 25a). When the shaft portion 52 of the screw member 50 is inserted through the contact portion 41 (the insertion hole 41a) in the vehicle lateral direction to clamp the panel bracket 23 between the head portion 51 and the contact portion 41, the position of the shaft portion 52 is adjusted in the insertion hole 41a in the front-rear direction. In this manner, by a significantly simple configuration employing the contact portion 41 and the elongated insertion hole 41a in combination, relative movement of the panel bracket 23 and the functional bracket 22 in the front-rear direction is selectively allowed and restricted as the non-fastened state and the fastened state are switched.

(5) In the present embodiment, the holding member 40 having the contact portion 41 functioning as the engagement portion and the nut member 46 fastened to the screw member 50 are provided as separate components. As a result, optimal material is employed for each of the components and reliability of each function is improved. Particularly, the nut member 46, which is related to fastening with the screw member 50, is not restricted by strength of the material of the contact portion 41 (the holding member 40). This ensures desirable fastening strength between the nut member 46 and the screw member 50 and, correspondingly, desirable joint strength between the panel bracket 23 and the holding member 40 (the contact portion 41). Also, since the contact portion 41 is used also as the engagement portion, the number of components is decreased.

(6) In the present embodiment, by assembling the holding member 40 to the nut member 46 having the insertion portion 47 inserted through the attachment hole 24, for example, the nut member 46 is clamped by the contact portion 41 and the support wall portion 45 in the vehicle lateral direction. This temporarily fixes the nut member 46 to the functional bracket 22, thus improving ease of assembly.

(7) In the present embodiment, by assembling the holding member 40 to the nut member 46 having the insertion portion 47 inserted through the attachment hole 24, for example, the two retainer portions 48 are engaged with the corresponding engagement pieces 45b. This further stabilizes the posture of the nut member 46 temporarily fixed to the functional bracket 22, thus further improving ease of assembly.

Also, since the retainer portions 48 are employed also for engagement with the engagement pieces 45b, shape complication is avoided.

(8) In the present embodiment, the two retainer portions 48, which are engaged with the corresponding edges of the attachment hole 24, are formed in the nut member 46. Accordingly, even if a vehicle occupant hits the movable panel 12 by head or the vehicle overturns to apply great force to the movable panel 12 from below to above (rollover), the holding member 40 and the like are unlikely to come off the functional bracket 22.

(9) In the present embodiment, the functional bracket 22 is fixed to the holding member 40 and the like in a state in which movement of the functional bracket 22 is allowed within a certain range between the two retainer portions 48, which are engaged with the corresponding edges of the attachment hole 24, and the contact portion 41 in the vehicle lateral direction. Accordingly, even if the relative positions of the panel bracket 23 and the functional bracket 22 in the vehicle lateral direction are changed by, for example, vibration of the vehicle, such change is absorbed by the nut member 46 and the like.

(10) In the present embodiment, the relative positions of the panel bracket 23 and the functional bracket 22 are adjustable in the vehicle lateral direction. This reliably connects the panel bracket 23 and the functional bracket 22 to each other without, for example, increasing the dimension of each guide rail 13 in the vehicle lateral direction. Also, the shaft insertion hole 31, which is formed in the panel bracket 23, is reduced in size in the front-rear direction. As a result, the size of the head portion 51 (the washer portion 51b) is decreased correspondingly and ease of assembly and mountability in a vehicle are improved.

(11) In the present embodiment, by reducing the size of the head portion 51 of the screw member 50, which is assembled to the panel bracket 23 from the vehicle inner side, space required in the assembling direction is decreased and the thickness of the device as a whole is reduced.

The first embodiment may be modified as follows.

In the first embodiment, the washer portion 51b of the head portion 51 of the screw member 50 may be omitted and an appropriate washer may be employed. Even in this case, by decreasing the dimension of the shaft insertion hole 31, which is formed in the panel bracket 23, in the front-rear direction, the washer is reduced in size correspondingly. This improves ease of assembly and mountability in a vehicle.

In the first embodiment, each retainer portion 48, which is formed in the nut member 46, may be configured in any suitable manner. For example, only one retainer portion 48 may be employed or three or more retainer portions 48 may be provided.

In the first embodiment, the insertion portion 47 of the nut member 46 may be shaped, for example, substantially like a circular column.

In the first embodiment, at least one of the two engagement pieces 45b may be omitted. Particularly, when both engagement pieces 45b are omitted, the support hole 45a may be omitted or the support wall portion 45 may be omitted.

In the first embodiment, at least one of the two elastic pieces 44a (the elastic wall portions 44) may be omitted.

In the first embodiment, at least one of the two first cover portions 42 and the second cover portion 43 may be omitted.

In the first embodiment, the holding member 40 and the screw member 50 may be fixed to the functional bracket 22 and the panel bracket 23 in reverse manners. Specifically, an attachment hole (24) is formed in the panel bracket 23 and the holding member 40 is fixed to the panel bracket 23. On the other hand, a shaft insertion hole (31) is formed in the functional bracket 22 and the screw member 50 is inserted through the shaft insertion hole and then fastened to the holding member 40. This modified case also ensures the same advantages as the advantages of the above described embodiment.

In the first embodiment, the functional bracket 22, which supports the movable panel 12 through the panel bracket 23, and the guide rail 13 (the rear shoe and the like) may be linked together in any suitable manner. For example, the opening 11 may be selectively opened and closed simply by pivoting the functional bracket 22 in the up-down direction about a front end portion of the functional bracket 22 as the fulcrum through movement of the rear shoe in the front-rear direction, or, in other words, through tilt-up/tilt-down operation of the movable panel 12. Alternatively, the opening 11 may be selectively opened and closed simply by moving the functional bracket 22 in the front-rear direction through movement of the rear shoe in the front-rear direction, or, in other words, through slide operation of the movable panel 12.

Second Embodiment

A vehicle sunroof device according to a second embodiment will now be described with reference to FIGS. 7 to 11. In the description below, same or like reference numerals are given to components of the second embodiment that are the same as or like corresponding components of the first embodiment and description thereof is omitted herein.

Figure 7:
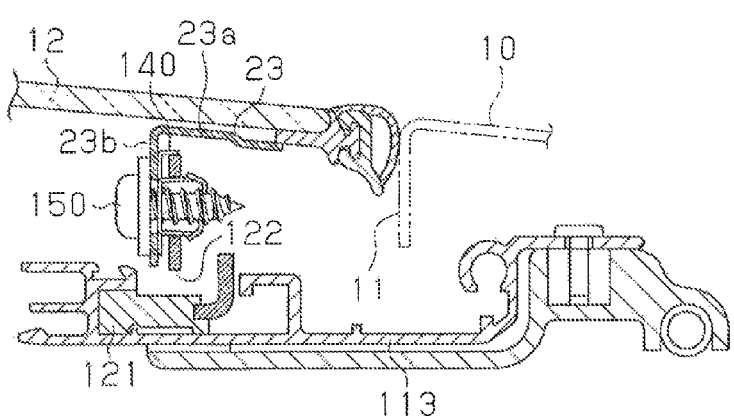
FIG. 7 is a cross-sectional view corresponding to FIG. 2, showing a second embodiment of the present invention.

As illustrated in FIG. 7, a sliding member 121 is supported by a guide rail 113, which is similar to the guide rail 13, in a manner slidable in the front-rear direction (the direction perpendicular to the sheet surface of FIG. 7). The sliding member 121 pivotally supports a front end portion of a functional bracket 122 serving as a second bracket configured by, for example, a metal plate, which is upright in the vehicle height direction and extends in the front-rear direction. In other words, the functional bracket 122 is movably supported by the guide rail 113 through the sliding member 121. A rear end portion of the functional bracket 122 is linked to an appropriate rear shoe (not shown), which is supported in a manner slidable in the guide rail 113 in the front-rear direction (description about how the functional bracket 122 and the rear shoe are linked to each other is omitted herein). The attachment portion 23b of the panel bracket 23 is opposed to the functional bracket 122 in the vehicle lateral direction at the vehicle inner side in the functional bracket 122.

A joint structure of the functional bracket 122 and the panel bracket 23 will hereafter be described.

Figure 8:
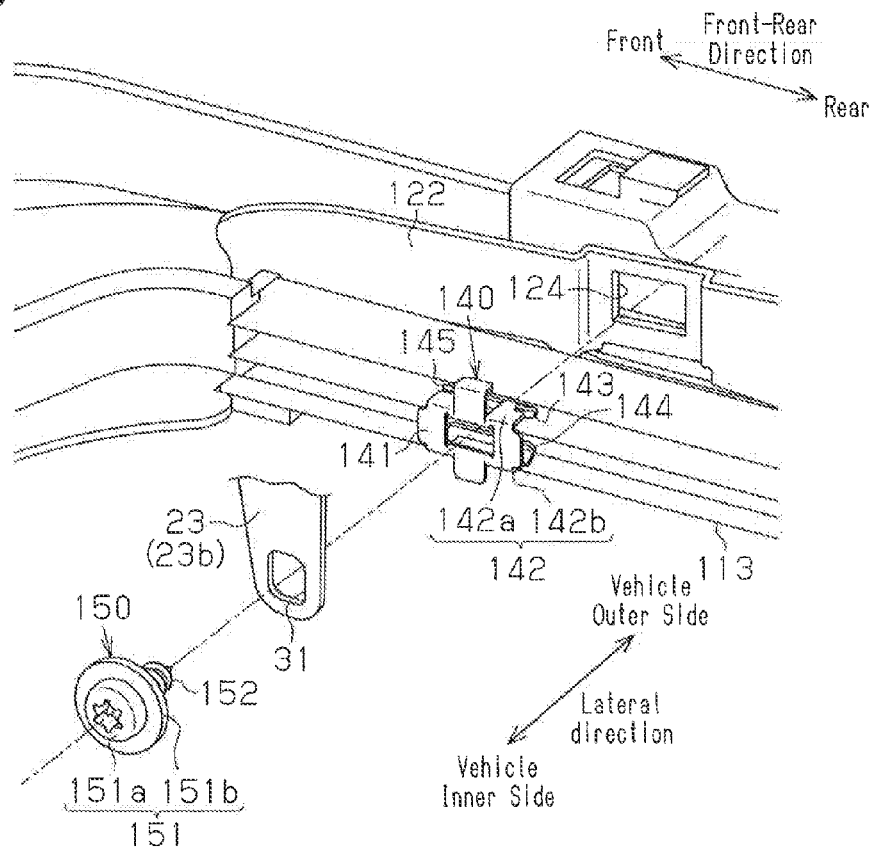
FIG. 8 is an exploded perspective view showing the second embodiment.
Figure 9A:
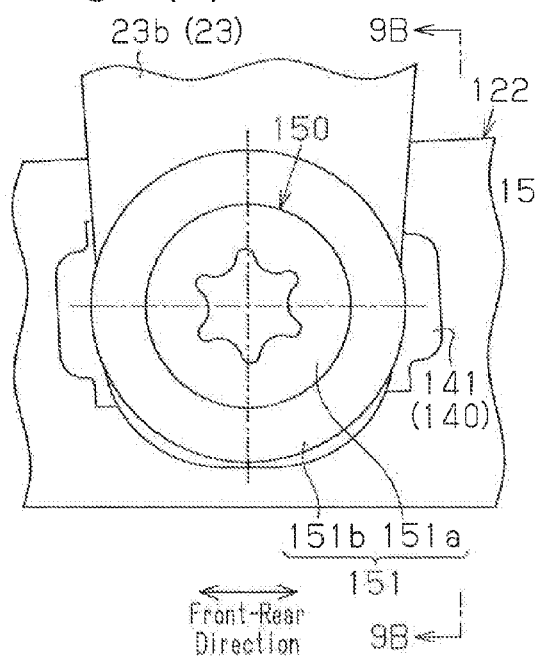
FIG. 9(a) is a side view showing the second embodiment as viewed from inside in the vehicle lateral direction.

With reference to FIGS. 8 and 9, an attachment hole 124, which is opened in the vehicle lateral direction, is formed in the functional bracket 122. The attachment hole 124 has a substantially rectangular shape extending in the front-rear direction. The shaft insertion hole 31 has an opening width that is substantially equal to the opening width of the attachment hole 124 in the vehicle height direction and smaller than the opening width of the attachment hole 124 in the front-rear direction. The shaft insertion hole 31 opposes the attachment hole 124 in the vehicle lateral direction such that the shaft insertion hole 31 is substantially arranged within the range corresponding to the attachment hole 124.

Figure 11A:
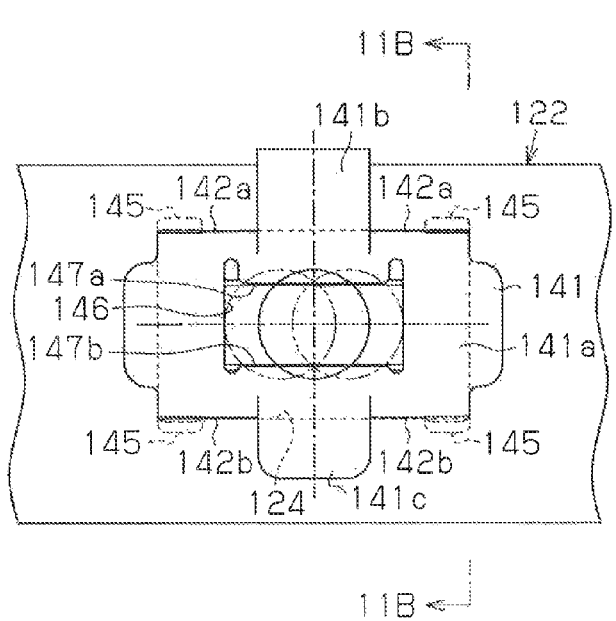
FIG. 11(a) is a side view showing the attachment member assembled to a functional bracket as viewed from inside in the vehicle lateral direction.
Figure 11B:
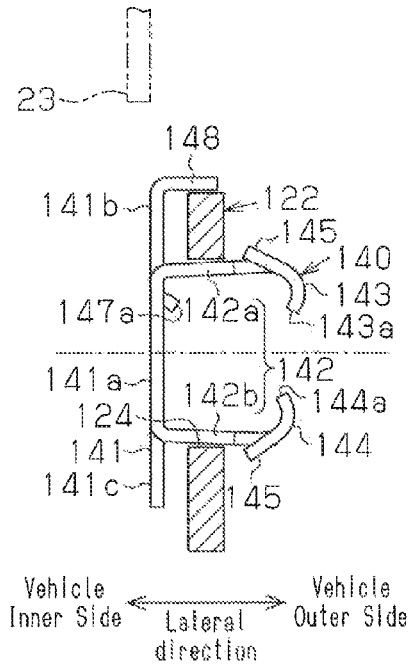
FIG. 11(b) is a cross-sectional view taken along line 11B-11B of FIG. 11 (a)

An attachment member 140, which is configured by, for example, a metal plate, is fixed to and supported by the functional bracket 122. As illustrated in FIGS. 11(a) and 11(b), the attachment member 140 includes a substantially rectangular body portion 141a and a pair of substantially square projecting portions 141b, 141c. The body portion 141a has a dimension in the front-rear direction that is greater than the opening width of the attachment hole 124 in the front-rear direction and a dimension in the vehicle height direction that is substantially equal to the opening width of the attachment hole 124 in the vehicle height direction. The projecting portion 141b and the projecting portion 141c extend from a middle portion of an upper edge and a middle portion of a lower edge, respectively, of the body portion 141a in the front-rear direction and project in opposite height directions. The body portion 141a and the two projecting portions 141b, 141c, as a whole, form a substantially cross-shaped contact portion 141. The contact portion 141 contacts the panel bracket 23 at a position between the functional bracket 122 and the panel bracket 23 in the vehicle lateral direction.

The attachment member 140 includes a pair of extended portions 142a, which are extended toward the vehicle outer side from opposite end portions of the upper edge of the body portion 141a in the front-rear direction that are located at opposite sides of the projecting portion 141b. The attachment member 140 also includes a pair of extended portions 142b, which are extended toward the vehicle outer side from opposite end portions of the lower edge of the body portion 141a in the front-rear direction that are located at opposite sides of the projecting portion 141c. The two extended portions 142a and the two extended portions 142b, which project from the body portion 141a (the contact portion 141) in the vehicle lateral direction, configure an insertion portion 142, which is inserted through the attachment hole 124.

With reference to FIGS. 10(a) to 10(c), the attachment member 140 includes an inward flange 143, which extends in the front-rear direction at a position between distal end portions of the two extended portions 142a extending through the attachment hole 124. The attachment member 140 also has an inward flange 144, which extends in the front-rear direction at a position between distal end portions of the two extended portions 142b extending through the attachment hole 124. In other words, the flanges 143, 144 bridge between the distal end portions of the corresponding extended portions 142a, 142b substantially in the ranges corresponding to the entire length of the body portion 141a. The flanges 143, 144 project inward toward each other.

With reference to FIG. 11(b), each of the flanges 143, 144 has an arcuate shape projected toward the vehicle outer side. The distal end of the flange 143 and the distal end of the flange 144, which are curved toward the vehicle inner side, form a distal-side internal threaded portion 143a and a distal-side internal threaded portion 144a, respectively, each of which configures a single-start internal thread portion.

A claw-like retainer portion 345 is formed in an end portion of each extended portion 142a, 142b in the front-rear direction, which is spaced from the corresponding projecting portion 141b, 141c. Each of the claw-like retainer portions 145 is cut and raised in an outward direction opposite to the extending direction of the corresponding one of the flanges 143, 144 from the connecting position of the flange 143, 144 as the starting point. Each retainer portion 145 is arranged at the vehicle outer side with respect to the functional bracket 122 and inclined substantially in a linear manner to project in the vehicle height direction with respect to the attachment hole 124 in a direction toward the vehicle inner side. The distance between the contact portion 141 and each retainer portion 145 in the vehicle lateral direction is set to a value greater than the thickness of the functional bracket 122. Accordingly, the attachment member 140 is fixed to the functional bracket 122 in a state in which the retainer portions 145 and the contact portion 141 clamp the functional bracket 122 in the vehicle lateral direction. That is, movement of the attachment member 140 in the vehicle lateral direction is stopped through engagement of each retainer portion 145 or the contact portion 141 with an opposed edge of the attachment hole 124. In other words, the position of the functional bracket 122 is adjustable relative to the attachment member 140 in the range between each retainer portion 145 and the contact portion 341 in the vehicle lateral direction.

With reference to FIGS. 10(a) to 10(c), a substantially rectangular insertion hole 146, which is opened in the vehicle lateral direction and extends in the front-rear direction, is formed in a middle portion of the body portion 141a. An upper edge of the insertion hole 146 is cut and raised diagonally downward toward the vehicle outer side to form a single-start internal threaded portion 147a. A lower edge of the insertion hole 146 forms a single-pitch internal threaded portion 147b. The internal threaded portions 147a, 147b, which are cut and raised in the contact portion 141, extend substantially in the range corresponding to the entire length of the insertion hole 146 in the front-rear direction and configure a nut member. The opening width of the insertion hole 146 in the vehicle height direction is set to a value substantially equal to the distance between the distal-side internal threaded portion 143a of the flange 143 and the distal-side internal threaded portion 144a of the flange 144.

The attachment member 140 also includes a cover portion 143, which extends from an upper edge of the projecting portion 141b toward the vehicle outer side. Specifically, the projecting portion 141b is formed using a remaining portion of the material (the metal plate) forming the attachment member 140, which is defined by the two extended portions 142a and the flange 143, together with the cover portion 148. Similarly, the projecting portion 141c is formed using a remaining portion of the material forming the attachment member 140, which is defined by the two extended portions 142a and the flange 144. In other words, the attachment member 140 is shaped to include all of the above-described components as an integral body simply by machining a single plate.

Figure 9B:
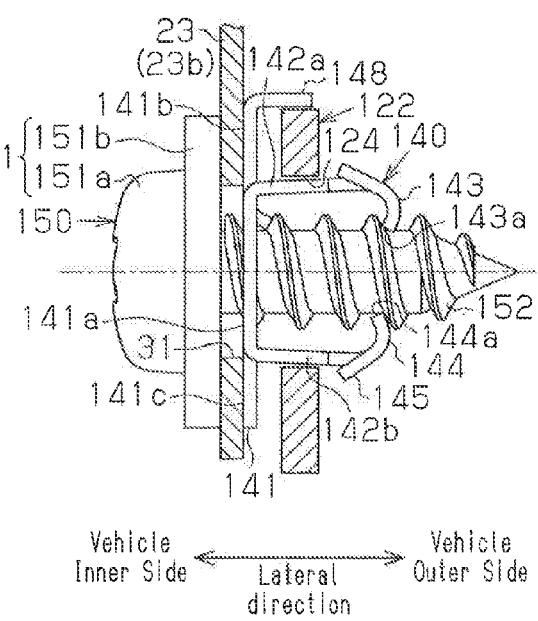
FIG. 9(b) is a cross-sectional view taken along line 9B-9B of FIG. 9(a)

With reference to FIG. 9(b), the cover portion 148 covers an upper portion of the functional bracket 122 substantially in the range corresponding to the entire range of the position adjustment range of the functional bracket 122 in the vehicle lateral direction. The panel bracket 23 contacts the contact portion 141 of the attachment member 140, which is fixed to the functional bracket 122, from the vehicle inner side. At this stage, the shaft insertion hole 31 of the panel bracket 23 is arranged such that the center line of the shaft insertion hole 31 extending in the vehicle lateral direction substantially coincides with the center of the insertion hole 146 in the vehicle height direction.

A screw member 150, which is fastened to the attachment member 140, is inserted though the shaft insertion hole 31. That is, the screw member 150 is formed of, for example, metal material and includes a head portion 151 and a shaft portion 152 as an integral body. The axis of the shaft portion 152 extends from the head portion 151 along the center line of the shaft insertion hole 31 in the vehicle lateral direction. The head portion 151 is coaxial with the shaft portion 152 and configured by a substantially pot-shaped thread head 151a having a substantially star-shaped groove and a substantially annular washer portion 151b. The washer portion 151b projects from the distal end of the thread head 151a at the side corresponding to the shaft portion 152 in radial directions about the center line of the thread head 151a. The outer diameter of the washer portion 151b is set to a value greater than the maximum opening width of the shaft insertion hole 31.

The shaft portion 52 has a thread. The outer diameter, which is the nominal diameter, of the thread is set to a value slightly smaller than the opening width of the shaft insertion hole 31 in the front-rear direction. In other words, the position of the shaft portion 152 (the screw member 150) is adjustable relative to the shaft insertion hole 31 mainly in the vehicle height direction. Additionally, the outer diameter of the thread is set to a value smaller than the opening width of the insertion hole 146 in the front-rear direction. The inner diameter of the thread is set to a value substantially equal to the opening width of the insertion hole 146 in the vehicle height direction (and the distance between the internal thread 143a of the flange 143 and the internal threaded portion 144a of the flange 144). The screw member 150 is fastened to the attachment member 140 by threading the shaft portion 152, which is loosely inserted through the shaft insertion hole 31 of the panel bracket 23 from the vehicle inner side, sequentially onto the internal threaded portions 147a, 147b and the distal-side internal threaded portions 143a, 144a of the attachment member 140.

At this stage, the contact portion 141 of the attachment member 140 and the head portion 151 (the washer portion 151b) of the screw member 150 both contact the panel bracket 23. Since the attachment member 140 and the screw member 150 are fastened to each other, the panel bracket 23 is clamped between the attachment member 140 and the screw member 150 (between the contact portion 141 and the head portion 151) by axial force and thus firmly fixed to the attachment member 140.

The shaft portion 152 (the screw member 150), which is loosely inserted through the shaft insertion hole 31, can be threaded sequentially onto the internal threaded portions 147a, 147b and the distal-side internal threaded portions 143a, 144a at any positions in the extending ranges of the internal threaded portions 147a, 147b and the distal-side internal threaded portions 143a, 144a in the front-rear direction. This allows adjustment of the position of the shaft portion 152 in the attachment hole 124 in the front-rear direction and adjustment of relative positions of the functional bracket 122 and the panel bracket 23 in the front-rear position. Then, the screw member 150 is fastened to the attachment member 140 with the functional bracket 122 and the panel bracket 23 located at predetermined relative positions in the front-rear direction. This fixes the functional bracket 122, the attachment hole 124 of which receives the insertion portion 142, and the panel bracket 23 to each other at the predetermined relative positions.

The shaft portion 152 is inserted between the two flanges 143, 144 (the distal-side internal threaded portions 143a, 144a), which extend through the attachment hole 124 of the functional bracket 122.

The panel bracket 23, which is connected to the functional bracket 122 through the attachment member 140 and the screw member 150 in the above-described manner, operates integrally with the functional bracket 122, together with the movable panel 12 supported by the panel bracket 23. When the functional bracket 122 pivots relative to the sliding member 121 or moves in the guide rail 113 in the front-rear direction together with the sliding member 121, the movable panel 12, which is supported by the panel bracket 23, selectively opens and closes the opening 11. Particularly, the movable panel 12 is allowed to move relative to the functional bracket 122 (and the guide rail 113), together with the panel bracket 23, in a certain range in the vehicle lateral direction. This decreases the influence of variations in manufacture and assembly so that the opening 11 is closed with improved reliability.

Operation of the present embodiment will hereafter be described.

By fastening the attachment member 140 and the screw member 150 to each other, the panel bracket 23 is clamped between the attachment member 140 and the screw member 150 (between the contact portion 141 and the head portion 151) by axial force and thus firmly fixed to the attachment member 140. On the other hand, the functional bracket 22 is fixed to the attachment member 140 in a state in which movement of the functional bracket 122 in the vehicle lateral direction is allowed within the range between the retainer portion 145 of each extended portion 142a, 142b, which is engaged with the corresponding edge of the attachment hole 124, and the contact portion 141. In this case, the relative positions of the panel bracket 23 and the functional bracket 122 are adjustable in the vehicle lateral direction. As a result, the panel bracket 23 and the functional bracket 122 are connected to each other with improved reliability.

When the attachment member 140 and the screw member 50 are fastened to each other, the position of the shaft portion 152 (the screw member 150), which is loosely inserted through the shaft insertion hole 31, is adjustable relative to the internal threaded portions 147a, 147b and the distal-side internal threaded portions 143a, 144a of the attachment member 140, the insertion portion 142 of which is inserted through the attachment hole 124, in the extending ranges of the internal threaded portions 147a, 147b and the distal-side internal threaded portions 143a, 144a in the front-rear direction. This allows adjustment of the relative positions of the functional bracket 122 and the panel bracket 23 in the front-rear direction. Then, the screw member 50 is fastened to the attachment member 140 with the functional bracket 122 and the panel bracket 23 located at predetermined relative positions in the front-rear direction. This fixes the functional bracket 122 and the panel bracket 23 to each other at the predetermined relative positions. Since the relative positions of the panel bracket 23 and the functional bracket 122 are adjustable in the front-rear direction in the above-described manner, the panel bracket 23 and the functional bracket 122 are connected together with improved reliability. Also, since the relative positions of the panel bracket 23 and the functional bracket 122 are adjustable in the front-rear direction, assembly accuracy of the panel bracket 23 and the functional bracket 122 required in the front-rear direction is decreased. The opening width of the shaft insertion hole 31 of the panel bracket 23 in the front-rear direction is thus reduced.

An assembling method of the present embodiment will hereafter be described.

As illustrated in FIGS. 11(a) and 11(b), to fix the attachment member 140 to the functional bracket 122, the insertion portion 142 is pressed into and inserted through the attachment hole 124 of the functional bracket 122 from the vehicle inner side with the portion at the side corresponding to the flanges 143, 144 located foremost. At this stage, the retainer portions 145 of the two extended portions 142a, 142b, which are pressed against the wall of the attachment hole 124, are elastically deformed in mutually opposite vehicle height directions in correspondence with inclination of each retainer portion 145 and thus passed through the attachment hole 124. This clamps the functional bracket 122 between the retainer portions 145 of the extended portions 142a, 142b, which elastically restore their shapes after having been passed through the attachment hole 124, and the contact portion 141 in the vehicle lateral direction. The functional bracket 122 is thus fixed to the attachment member 140.

Subsequently, the panel, bracket 23 is provided from above the attachment member 140 and caused to contact the contact portion 141 from the vehicle inner side. At this stage, since the cover portion 148 is arranged in the assembling direction of the panel bracket 23, it is unlikely that the panel bracket 23 will erroneously enter the gap between the contact portion 141 and the retainer portion 145 of each extended portion 142a, 142b.

Afterwards, with reference to FIGS. 9(*a*) and 9(*b*), the panel, bracket 23 is arranged such that the position of the center line of the shaft insertion hole 31 of the panel bracket 23 extending in the vehicle lateral direction substantially coincides with the position of the center of the insertion hole 146 in the vehicle height direction. In this state, the shaft portion 152 of the screw member 150 is loosely inserted through the shaft insertion hole 31 of the panel bracket 23 from the vehicle inner side. At this stage, the position of the shaft portion 152 in the range between the two internal threaded portions 147a, 147b in the front-rear direction is adjusted in correspondence with the relative positions of the shaft insertion role 31 of the panel bracket 23 and the insertion hole 146 of the attachment member 140 (which is the attachment hole 124 of the functional bracket 122) in the front-rear direction. The shaft portion 152 of the screw member 150 is then screwed onto the internal threaded portions 147a, 147b and the distal-side internal threaded portions 143a, 144a sequentially, such that the screw member 150 and the attachment member 140 are fastened together. This fixes the functional bracket 122 to the panel bracket 23 at the current position. Great fastening force is obtained by pulling the internal threaded portions 147a, 147b when fastening the screw member. 1.50. After the screw member 150 and the attachment member 140 are fastened together, movement of the shaft portion 152 within the range between the internal threaded portions 147a, 147b in the front-rear direction is stopped. As a result, the relative positions of the panel bracket 23 and the functional bracket 122 in the front-rear direction are fixed.

In the above-described manner, the functional bracket 122 and the panel bracket 23 are connected to each other through the attachment member 140 and the screw member 150.

Particularly, since the shaft portion 152 of the screw member 150 is inserted between the two flanges 143, 144 (the distal-side internal threaded portions 143a, 144a), the starting point of elastic deformation at the time when the retainer portions 145 of the two extended portions 142a, 142b are passed through the attachment hole 124 corresponds to the position at which the flanges 143, 144 contact the shaft portion 152. This reduces the length of the moment of force related to the elastic deformation and thus decreases the elastic deformation of the retainer portions 145 of the two extended portions 142a, 142b, compared to, for example, a case in which the shaft portion 152 of the screw member 150 is not inserted between the flanges 143, 144. As a result, the attachment member 140 is unlikely to come off the functional bracket 122.

As has been described in detail, the first embodiment has the advantages described below.

(1) In the present embodiment, by fastening the attachment member 140 and the screw member 150 to each other, the panel bracket 23 is clamped between the contact portion 141 and the head portion 151 and fixed to the attachment member 140. On the other hand, the functional bracket 122 is fixed to the attachment member 140 by inserting the insertion portion 142 through the attachment hole 124 with the retainer portions 145 of the two extended portions 142a, 142b elastically deforming so that the retainer portions 145 of the extended portions 142a, 142b become engaged with the corresponding edges of the attachment hole 124 after having been passed through the attachment hole 124. The functional bracket 122 is allowed to move within the range between the contact portion 141 and the retainer portion 145 of each extended portion 142a, 142b in the vehicle lateral direction. In this case, the relative positions of the panel bracket 23 and the functional, bracket 122 is adjustable in the vehicle lateral direction. As a result, the panel bracket 23 and the functional bracket 122 are connected to each other with improved reliability.

Particularly, since the shaft portion 152 of the screw member 150 is inserted between the two flanges 143, 144, it is unlikely that the attachment member 140 will come off the functional bracket 122. This decreases the likelihood that the panel bracket 23 and the functional bracket 122 are disconnected from each other.

(2) In the present embodiment, the attachment member 140 and the screw member 150 are fastened together in the immediate proximity of the panel bracket 23 (the internal threaded portions 147a, 147b), which is clamped by the attachment member 140 and the screw member 150 (the contact portion 141 and the head portion 151). The panel bracket 23 is thus fixed with increased firmness.

(3) In the present embodiment, the distal-side internal threaded portions 143a, 144a of the flanges 143, 144 and the shaft portion 152 are threaded onto each other. Accordingly, the pull amount of the distal-side internal threaded portions 143a, 144a toward the head portion 151 is adjusted in correspondence with the fastening amount (the rotation amount) of the shaft portion 152 (the screw member 150). Correspondingly, the outward projecting length (the retainer height) of the retainer portion 145 of each extended portion 142a, 142b, which is correlated to the pull amount, is also adjusted. As a result, the engagement amount between the retainer portion 145 of each extended portion 142a, 142b and the corresponding edge of the attachment hole 124 is adjusted to improve retainer function.

(4) In the present embodiment, when the shaft portion 152 is inserted through (threaded onto) the insertion hole 146 of the contact portion 141, the position of the shaft portion 152 is adjusted in the range corresponding to the insertion hole 146 (the elongated hole) in the front-rear direction. As a result, the shaft insertion hole 31 of the panel bracket 23 is reduced in size in the front-rear direction.

(5) In the present embodiment, when the panel bracket 23 is assembled in a state in which the attachment member 140 is fixed to the functional bracket 122 in advance, the cover portion 148 is arranged in the assembling direction of the panel bracket 23. The panel bracket 23 is thus unlikely to enter the gap between the contact portion 141 and each retainer portion 145 and guided toward the vehicle inner side with respect to the contact portion 141. This improves ease of assembly.

(6) In the present embodiment, the internal threaded portions 147a, 147b, which are cut and raised in the contact portion 141, are employed as a nut member. This decreases the number of components compared to, for example, a case in which the nut member is provided separately from the contact portion 141 (the attachment member 140).

(7) In the present embodiment, the retainer portions 145, which are engaged with the corresponding edges of the attachment hole 124, are formed in the two extended portions 142a, 142b of the attachment member 140. Accordingly, even if a vehicle occupant hits the movable panel 12 by head or the vehicle overturns to apply great force to the movable panel 12 from below to above (rollover), it is unlikely that the attachment member 140 will come off the functional bracket 122.

(8) In the present embodiment, the head portion 151 of the screw member 150, which is assembled to the panel bracket 23 from the vehicle inner side, is reduced in size. This saves space required in the assembling direction and thus decreases the thickness of the device as a whole.

The second embodiment may be modified as follows.

In the second embodiment, the washer portion 151b of the head portion 151 of the screw member 150 may be omitted and an appropriate washer may be arranged. Even in this case, by decreasing the size of the shaft insertion hole 31, which is formed in the panel bracket 23, in the front-rear direction, the washer is reduced in size correspondingly. This improves ease of assembly and mountability in a vehicle.

In the second embodiment, a plurality of retainer portions 145 may be formed in each of the extended portions 142a, 142b.

The second embodiment may employ an insertion portion (an extended portion) that extends substantially in the range corresponding to the entire length of the body portion 141a (the attachment hole 124) in the front-rear direction. In this case, the projecting portions 141b, 141c and the cover portion 148 are omitted. Any appropriate number of retainer portions may be cut and raised in each extended portion.

In the second embodiment, the insertion portion (142) projecting from the contact portion 141 (the body portion 141a) in the vehicle lateral direction may have a substantially rectangular tube-like shape. In this case, the contact portion (141) is formed using an appropriate portion of the material (the metal plate) forming the attachment member 140. Also, similar retainer portions (45) are formed in a pair of extended portions opposed to each other in at least one of the front-rear direction and the vehicle height direction.

In the second embodiment, the cover portion 148 may be omitted.

In the second embodiment, the position adjustment function of the shaft portion 152 of the screw member 150 in the range corresponding to the insertion hole (the elongated hole) 146 of the attachment member 140 or the like in the vehicle front-rear direction may be omitted. In other words, the opening width of the insertion hole 146 in the front-rear direction may be substantially equal to, for example, the opening width of the shaft insertion hole 31 in the front-rear direction.

In the second embodiment, the distal-side internal threaded portions 143a, 144a do not necessarily have to be formed in the flanges 143, 144 of the attachment member 140. That is, as long as the shaft portion 152 of the screw member 150 is held in contact with or arranged in the vicinity of the flanges 143, 144 of the attachment member 140 by the outer peripheral portion of the shaft portion 152, any suitable configuration may be employed.

In the second embodiment, the internal threaded portions 147a, 147b may be replaced by a nut member that is arranged separately from the contact portion 141 (the attachment member 140). In this case, the nut member ensures required strength without being limited by strength of the material of the contact portion 141 (the attachment member 140). As a result, the panel bracket 23 is fixed to the attachment member 140 with increased firmness.

The second embodiment may include an appropriate urging member for urging the functional bracket 122 toward the contact portion 141 in the vehicle lateral direction. In this case, the functional bracket 122, which is urged by the urging member, is held in contact with or arranged in the vicinity of the contact portion 141. Accordingly, when the panel bracket 23 is assembled in the up-down direction with the attachment member 140 held in a state temporarily assembled to the functional bracket 122, the gap in the vehicle lateral direction is blocked such that the panel bracket 23 is unlikely to enter the gap between the functional bracket 122 and the contact portion 141. This improves ease of assembly.

The urging member also decreases vibration of the functional bracket 122 in the vehicle lateral direction and noise caused by the vibration.

In the second embodiment, the attachment member 140 and the screw member 150 may be fixed to the functional bracket 122 and the panel bracket 23 in reverse manners. Specifically, an attachment hole (124) is formed in the panel bracket 23 and the attachment member 140 is fixed to the attachment hole. On the other hand, a shaft insertion hole (31) is formed in the functional bracket 122 and the screw member 150 is inserted through the shaft insertion hole and then fastened to the attachment member 140. This modified case also ensures the same advantages as the advantages of the above described embodiment.

In the second embodiment, the functional bracket 122, which supports the movable panel 12 through the panel bracket 23, and the guide rail 113 (the rear shoe and the like) may be linked together in any suitable manner. For example, the opening 11 may be selectively opened and closed simply by pivoting the functional bracket 122 in the up-down direction about a front end portion of the functional bracket 122 as the fulcrum through movement of the rear shoe in the front-rear direction, or, in other words, through tilt-up/tilt-down operation of the movable panel 12. Alternatively, the opening 11 may be selectively opened and closed simply by moving the functional bracket 122 in the front-rear direction through movement of the rear shoe in the front-rear direction, or, in other words, through slide operation of the movable panel 12.

Third Embodiment

A vehicle sunroof device according to a third embodiment will now be described with reference to FIGS. 12 to 16. In the description below, same or like reference numerals are given to components of the third embodiment that are the same as or like corresponding components of the first embodiment. Description of these components is omitted herein.

Figure 12:
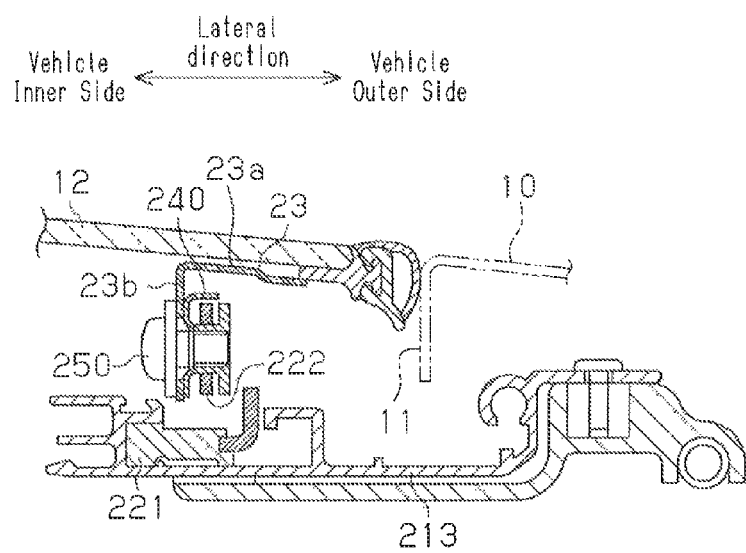
FIG. 12 is a cross-sectional view corresponding to FIG. 2, showing a third embodiment of the present invention.

As illustrated in FIG. 12, a sliding member 221 is supported by a guide rail 213, which is similar to the guide rail 13, in a manner slidable in the front-rear direction (the direction perpendicular to the sheet surface of FIG. 12). The sliding member 221 pivotally supports a front end portion of a functional bracket 222 serving as a second bracket configured by, for example, a metal plate, which is upright in the vehicle height direction and extends in the front-rear direction. In other words, the functional bracket 222 is movably supported by the guide rail 213 through the sliding member 221. A rear end portion of the functional bracket 222 is linked to an appropriate rear shoe (not shown), which is supported in a manner slidable in the guide rail 213 in the front-rear direction (description about how the functional bracket 222 and the rear shoe are linked to each other is omitted herein). The attachment portion 23b of the panel bracket 23 is opposed to the functional bracket 222 in the vehicle lateral direction at the vehicle inner side in the functional bracket 222.

A joint structure of the functional bracket 222 and the panel bracket 23 will hereafter be described.

Figure 13:
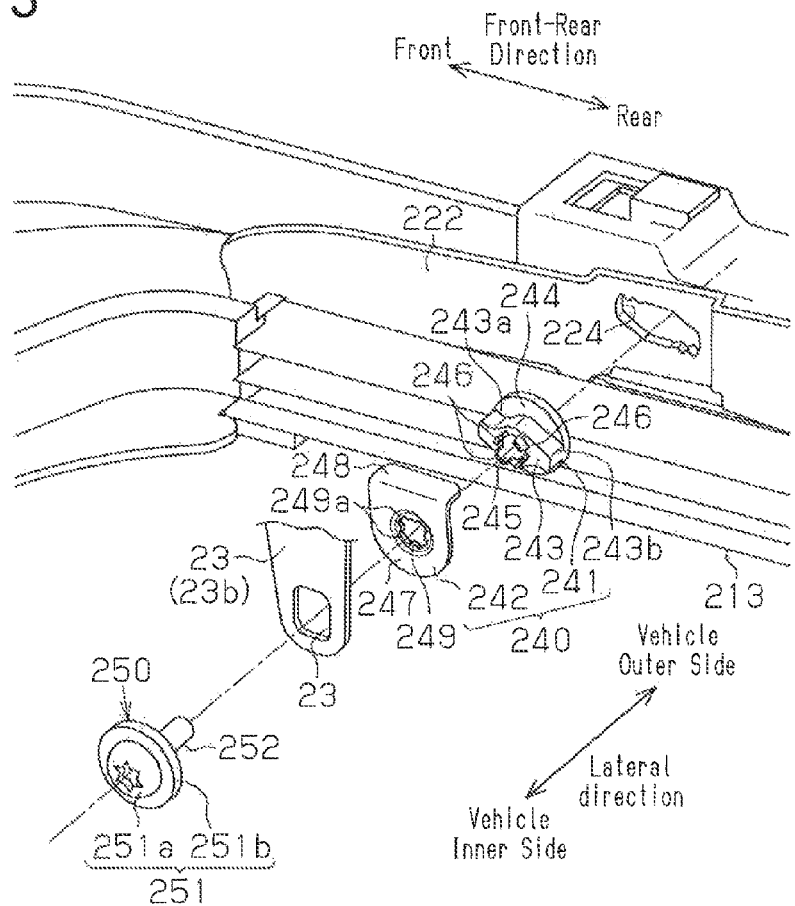
FIG. 13 is an exploded perspective view showing the third embodiment.
Figure 14:
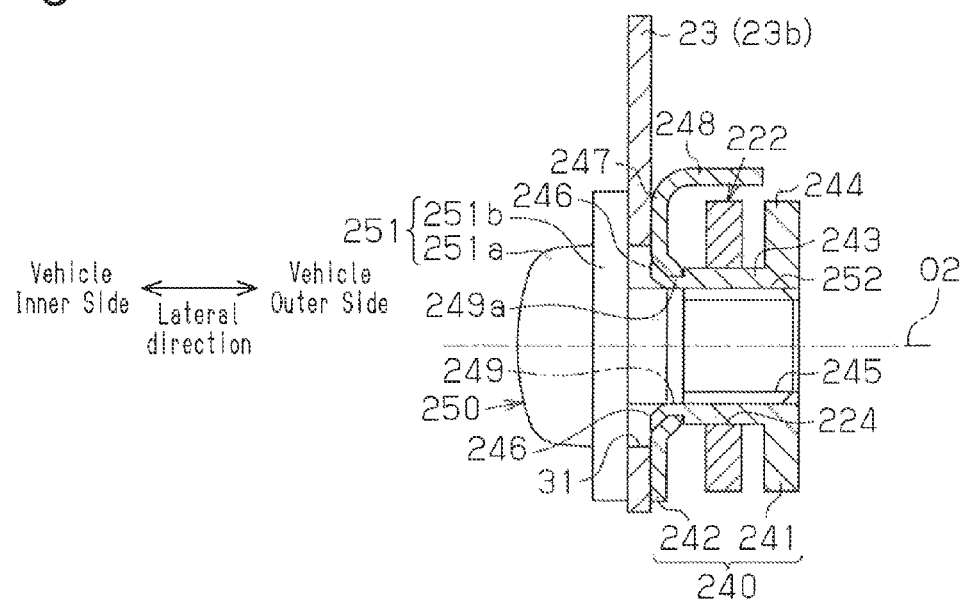
FIG. 14 is a longitudinal cross-sectional view showing the third embodiment.

With reference to FIGS. 13 and 14, an attachment hole 224, which is opened in the vehicle lateral direction, is formed in the functional bracket 222. The attachment hole 224 has an elongated shape extending in the front-rear direction. The shaft insertion hole 31 has an opening width that is greater than the opening width of the attachment hole 224 in the vehicle height direction and smaller than the opening width of the attachment hole 224 in the front-rear direction. The shaft insertion hole 31 is opposed the attachment hole 224 in the vehicle lateral direction.

Figure 15:
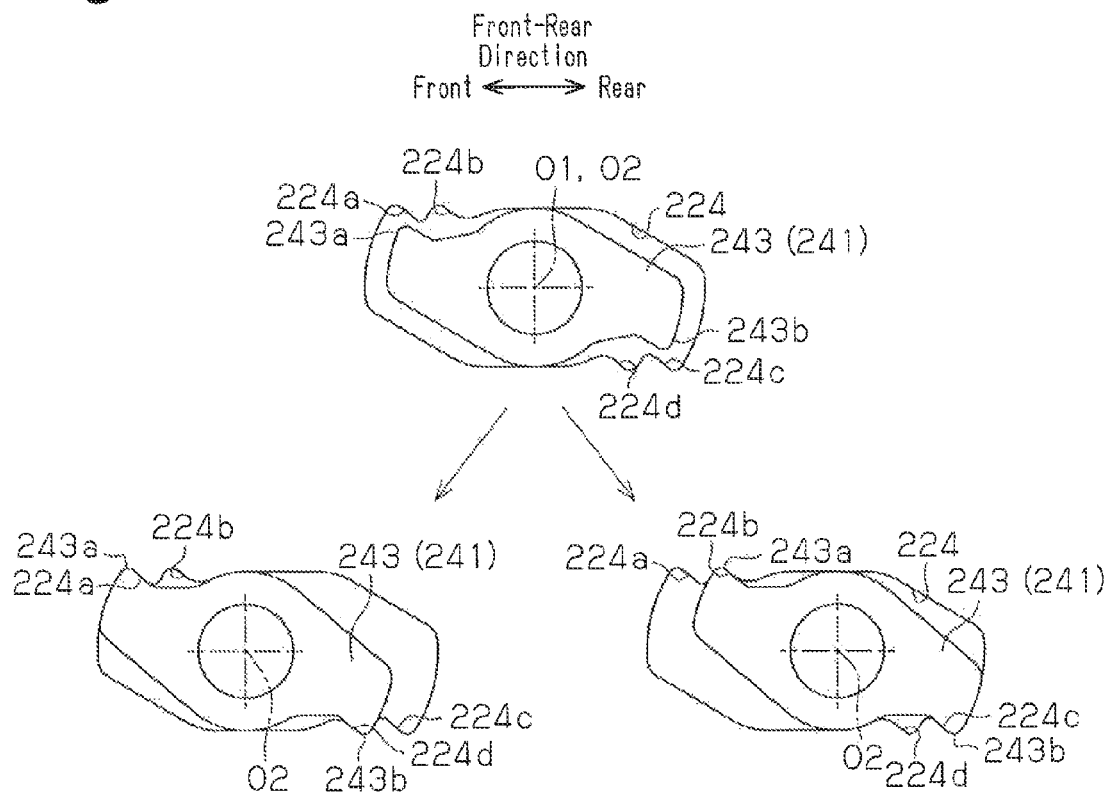
FIG. 15 is a diagram illustrating a position adjustment manner of a nut member relative to the functional bracket in the vehicle front-rear direction.

As illustrated in FIG. 15, the attachment hole 224 is rotationally symmetric with respect to the center line O1 extending in the vehicle lateral direction (the direction perpendicular to the sheet surface of FIG. 15). In a front side portion of the attachment hole 224 with respect to the center line O1, multiple (two) substantially V-shaped stopping grooves 224a, 224b are formed in an inner wall portion on the leading side in the clockwise direction about the center line O1 as viewed in FIG. 15 and are recessed in the aforementioned rotational direction. In a rear side portion of the attachment hole 224 with respect to the center line O1, a plurality of (two) substantially V-shaped stopping grooves 224c, 224d are formed in an inner wall portion on the leading side in the clockwise direction about the center line O1 as viewed in the drawing and are recessed in the aforementioned rotational direction. The stopping grooves 224a, 224b and the stopping grooves 224c, 224d are arranged in the front-rear direction and spaced apart at equal intervals.

With reference to FIGS. 13 and 14, a nut member 240 is fixed to and supported by the functional bracket 222. The nut member 240 includes a nut body 241 and a plate member 242, which are formed of, for example, metal. The nut body 241 has a pillar-like insertion portion 243, which is loosely inserted through the attachment hole 224 of the functional bracket 222 from the vehicle outer side. The nut body 241 also includes a substantially annular retainer portion 244, which is located at the vehicle outer side end of the insertion portion 243 and projects from the insertion portion 243 in radial directions about the center line O2 extending in the vehicle lateral direction. In FIG. 13, for illustrative purposes, the nut body 241 is illustrated as arranged at the vehicle inner side with respect to the functional bracket 222.

The nut body 241 has a threaded hole 245 extending through the nut body 241 along the center line O2 in the vehicle lateral direction. The nut body 241 also includes a plurality of (four) claw-like joint pieces 246, which are located radially outward to the threaded hole 245, projected from the vehicle inner side end of the insertion portion 243 toward the vehicle inner side, and spaced apart at equal angular intervals in a circumferential direction about the center line O2. Specifically, the insertion portion 243 has a dimension in the vehicle lateral direction greater than the thickness of the functional bracket 222, a dimension in the front-rear direction smaller than the corresponding dimension of the attachment hole 224, and a dimension in the vehicle height direction substantially equal to the corresponding dimension of the attachment hole 224 and extends in the font-rear direction. The diameter of the retainer portion 244 is substantially equal to the dimension of the insertion portion 243 in the front-rear direction.

As illustrated in FIG. 15, the insertion portion 243 is rotationally symmetric with respect to the center line O2 extending in the vehicle lateral direction (the direction perpendicular to the sheet surface of FIG. 15). In a front side portion of the insertion portion 243 with respect to the center line O2, a claw-like stopping projection 243a is formed in a distal end portion on the leading side in the clockwise direction about the center line O2 as viewed in FIG. 35 and projects in the aforementioned rotational direction. In a rear side portion of the insertion portion 243 with respect to the center line O2, a claw-like stopping projection 243b is formed in a distal end portion on the leading side in the clockwise direction about the center line O2 as viewed in the drawing and projects in the aforementioned rotational direction. The stopping projection 243a and the stopping projection 243b are engageable with the stopping groove 224a and the stopping groove 224d, respectively, or the stopping groove 224b and the stopping groove 224c, respectively. Accordingly, the insertion portion 243 may be located at two positions in the attachment hole 224 in the front-rear direction, including the position corresponding to the front side in which the stopping projections 243a, 243b are engaged with the corresponding stopping grooves 224a, 224d (hereinafter, referred to as "the front side position Pf") and the position corresponding to the rear side in which the stopping projections 243a, 243b are engaged with the corresponding stopping grooves 224b, 224c (hereinafter, referred to as "the rear side position Pr").

With reference to FIGS. 13 and 14, a plate member 242 is configured by, for example, a plate material and includes a flat contact portion 247 and a cover portion 248. The contact portion 247 has a dimension in the front-rear direction and a dimension in the vehicle height direction that are substantially equal to the diameter of the retainer portion 244. The cover portion 248 extends from an upper edge of the contact portion 247 toward the vehicle outer side. An insertion hole 249, which extends along the center line O2 and faces in the vehicle lateral direction, is formed in the contact portion 247. The inner diameter of the insertion hole 249 is set to a value greater than the inner diameter of the threaded hole 245. Multiple (four) engagement grooves 249a are formed in the plate member 242 and spaced apart at equal angular intervals in a circumferential direction of the insertion hole 249. The engagement grooves 249a are recessed in radial direction about the center line O2 and the aforementioned joint pieces 246 are received in the engagement grooves 249a.

The joint pieces 246, which extend through the corresponding engagement grooves 249a in the vehicle lateral direction, are radially extended and pressed against and held in contact with corresponding edges of the engagement grooves 249a. The plate member 242 is thus integrated with the nut body 241. The nut member 240 is fixed to the functional bracket 222 in a state in which the functional bracket 222 is clamped between the retainer portion 244 of the nut body 241 and the contact portion 247 of the plate member 242 in the vehicle lateral direction. That is, movement of the nut member 240 in the vehicle lateral direction is stopped by engaging the retainer portion 244 or the contact portion 247 with the opposed edge of the attachment hole 224. In other words, the position of the functional bracket 222 is adjustable relative to the nut member 240 in the range between the retainer portion 244 and the contact portion 247 in the vehicle lateral direction. The cover portion 248 of the plate member 242 covers an upper portion of the functional bracket 222 substantially in the range corresponding to the entire length of the position adjustment range of the functional bracket 222 in the vehicle lateral direction.

In the nut member 240 fixed to the functional bracket 222, the panel bracket 23 contacts the contact portion 247 of the plate member 242 from the vehicle inner side. At this stage, the shaft insertion hole 31 of the panel bracket 23 is arranged such that the center line of the shaft insertion hole 31 extending in the vehicle lateral direction substantially coincides with the center line O2 of the insertion portion 243.

A screw member 250, which is fastened to the nut member 240 (the nut body 241), is inserted through the shaft insertion hole 31. That is, the screw member 250 is configured by, for example, metal material and includes a head portion 251 and a shaft portion 252 as an integral body. The axis of the shaft portion 252 extends from the head portion 251 along the center line O2 in the vehicle lateral direction. The head portion 251 is coaxial with the shaft portion 252 and includes a substantially pot-shaped thread head 251a having a substantially star-shaped groove and a substantially annular washer portion 251b. The washer portion 251b projects from the distal end of the thread head 251a at the side corresponding to the shaft portion 252 in radial directions about the center line O2. The outer diameter of the washer portion 251b is greater than the maximum opening width of the shaft insertion hole 31. The shaft portion 252 includes a thread. The outer diameter, which is the nominal diameter, of the thread (and the core diameter of the threaded hole 45) is (are) set to a value substantially equal to the opening width of the shaft insertion hole 31 in the front-rear direction. In other words, the position of the shaft portion 252 (the screw member 250) is adjustable relative to the shaft insertion hole 31 only in the vehicle height direction basically. The screw member 250 is fastened to the nut member 240 by threading the shaft portion 252, which is loosely inserted through the shaft insertion hole 31 of the panel bracket 23 and the insertion hole 249 of the plate member 242 sequentially from the vehicle inner side, onto the threaded hole 245 of the nut body 241.

At this stage, the contact portion 247 of the nut member 240 (the plate member 242) and the head portion 251 (the washer portion 251b) of the screw member 250 each contact the panel bracket 23. Since the nut member 240 and the screw member 250 are fastened together, the panel bracket 23 is clamped between the nut member 240 and the screw member 250 (the contact portion 247 and the head portion 251) by axial force and thus firmly fixed to the nut member 240.

The rotational direction (the fastening direction) of the screw member 250 at the time when the screw member 250 is fastened to the nut member 240 coincides with the rotational direction (the clockwise direction as viewed in FIG. 5) in which the stopping projections 243a, 243b become engaged with the corresponding stopping grooves 224a, 224d or the corresponding stopping grooves 224b, 224c. Accordingly, when the screw member 250 is fastened to the nut member 240, the nut member 240 is firmly fixed to the functional bracket 222 in the front-rear direction with the stopping projections 243a, 243b, which are engaged with the corresponding stopping grooves 224a, 224d or the corresponding stopping grooves 224b, 224c, pressed against the stopping grooves 224a, 224d or the stopping grooves 224b, 224c as fastening continues. In other words, the nut member 240 is firmly fixed to the functional bracket 222 at the front side position Pf or the rear side position Pr. The relative positions of the functional bracket 222 and the panel bracket 23 can be adjusted by two steps in the front-rear direction by selecting either one of the two positions as the position of the nut member 240 relative to the functional bracket 222 in the front-rear direction.

The panel bracket 23, which is connected to the functional bracket 222 through the nut member 240 and the screw member 250 in the above-described manner, operates integrally with the functional bracket 222, together with the movable panel 12 supported by the panel bracket 23. The opening 11 is selectively opened and closed by the movable panel. 12 supported by the panel bracket 23 when the functional bracket 222 pivots relative to the sliding member 221 or moves in the guide rail 213 in the front-rear direction together with the sliding member 221. Particularly, the movable panel 12 is allowed to move within a certain range relative to the functional bracket 222 (and the guide rail 213), together with the panel bracket 23, in the vehicle lateral direction. This decreases the influence of variations during manufacture and assembly so that the opening 11 is closed with improved reliability.

Operation of the present embodiment will hereafter be described.

By fastening the nut member 240 and the screw member 250 to each other, the panel bracket 23 is clamped between the nut member 240 and the screw member 250 (the contact portion 247 and the head portion 251) by axial force and firmly fixed to the nut member 240. On the other hand, the functional bracket 222 is fixed to the nut member 240 in a state in which movement of the functional bracket 222 in the vehicle lateral direction is allowed within the range between the retainer portion 244, which is engaged with the corresponding edge of the attachment hole 224, and the contact portion 247. In this case, the relative positions of the panel bracket 23 and the functional bracket 222 are adjustable in the vehicle lateral direction. As a result, the panel bracket 23 and the functional bracket 222 are connected to each other with improved reliability.

At this stage, the position of the insertion portion 243 is adjusted relative to the functional bracket 222 in the front-rear direction by two steps by selecting the stopping grooves 224a, 224d or the stopping grooves 224b, 224c for engagement with the stopping projections 243a, 243b, which are formed in the insertion portion 243. Alternatively, movement of the insertion portion 243 in the front-rear direction is stopped by engaging the stopping projections 243a, 243b with the stopping grooves 224a, 224d or the stopping grooves 224b, 224c in the rotational direction in which the screw member 250 is fastened. Simultaneously, when the stopping projections 243a, 243b contact walls of the stopping grooves 224a, 224d or the stopping grooves 224b, 224c in the rotational direction in which the screw member 250 is fastened, the stopping projections 243a, 243b function as detents. Since the relative positions of the panel bracket 23 and the functional bracket 222 are adjustable in the front-rear direction in the above-described manner, the panel bracket 23 and the functional bracket 222 are connected to each other with improved reliability. Also, since the relative positions of the panel bracket 23 and the functional bracket 222 are adjustable in the front-rear direction, assembly accuracy required in the front-rear direction is decreased and the opening width of the shaft insertion hole 31 of the panel bracket 23 is reduced.

Figure 16:
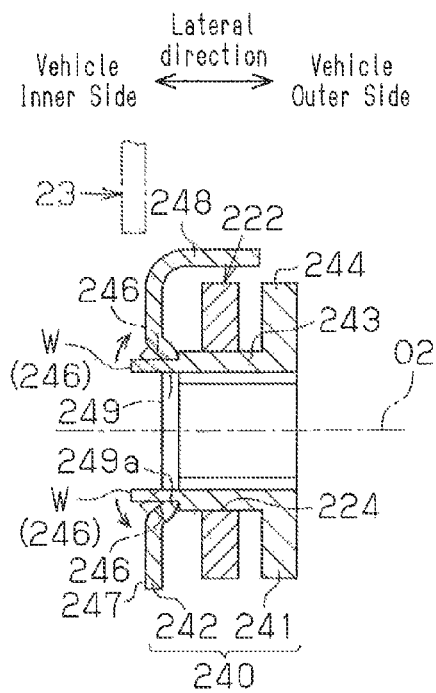
FIG. 16 is a longitudinal cross-sectional view showing a assembling manner in the third embodiment.
Figure 17:
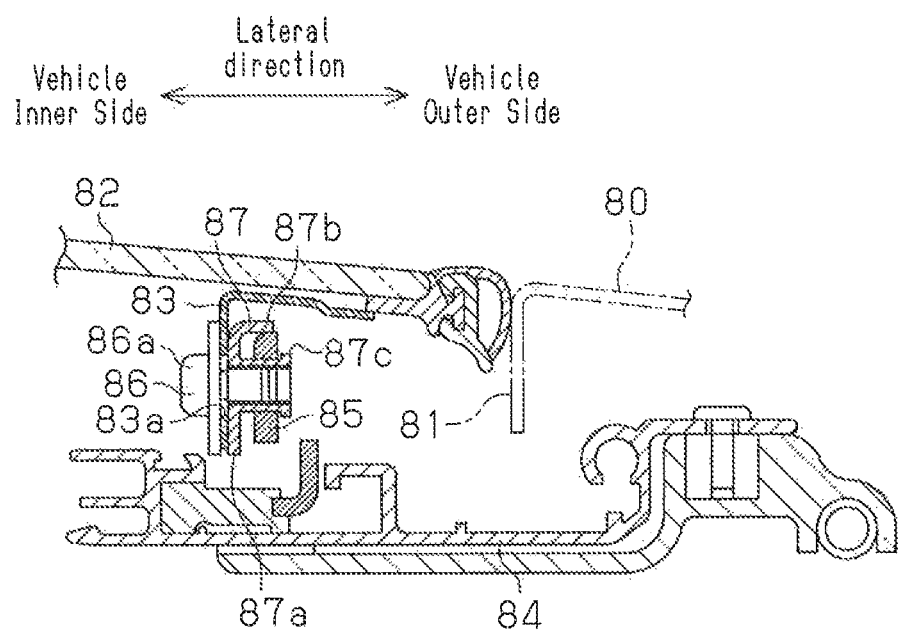
FIG. 17 is a longitudinal cross-sectional view showing a conventional form.

As illustrated in FIG. 16, when the nut member 240 is fixed to the functional bracket 222, the insertion portion 243 is inserted (loosely inserted) through the attachment hole 224 of the functional bracket 222 from the vehicle outer side with the portion of the nut body 241 at the side corresponding to the joint piece 246 located foremost. Then, the multiple joint pieces 246 before bending (hereinafter, referred to as "the joint piece workpieces W"), which project linearly from the attachment hole 224 of the functional bracket 222 toward the vehicle inner side, are inserted through the corresponding engagement grooves 249a of the plate member 242. In this state, as represented by the long dashed double-short dashed lines in FIG. 16, the joint piece workpieces W are pressed against the corresponding edges of the engagement grooves 249a in a state extended radially such that the nut body 241 and the plate member 242 are integrated with each other. The nut member 240 is thus fixed to the functional bracket 222. At this stage, movement of the nut member 240 in the attachment hole 224 in the front-rear direction is allowed such that the front side position Pf or the rear side position Pr can be selected with respect to the functional bracket 222. As has been described, the position of the functional bracket 222 is adjustable relative to the nut member 240 in the range between the retainer portion 244 and the contact portion 247 in the vehicle lateral direction.

Subsequently, the panel bracket 23 is assembled from above the nut member 240 (the plate member 242) and caused to contact the contact portion 247 of the plate member 242 from the vehicle inner side. At this stage, since the cover portion 248 of the plate member 242 is arranged in the assembling direction of the panel bracket 23, it is unlikely that the panel bracket 23 will erroneously enter the gap between the contact portion 247 and the retainer portion 244.

Afterwards, with reference to FIG. 14, the panel bracket 23 is arranged such that the center line of the shaft insertion hole 31 of the panel bracket 23 extending in the vehicle lateral direction substantially coincides with the center line O2. At this stage, the position of the nut member 240 is adjusted to the front side position Pf or the rear side position Pr in correspondence with the relative positions of the shaft insertion hole 31 of the panel bracket 23 and the attachment hole 224 of the functional bracket 222 in the front-rear direction. In this state, the shaft portion 252 of the screw member 250 is loosely inserted through the shaft insertion hole 31 of the panel bracket 23 and the insertion hole 249 of the plate member 242 sequentially from the vehicle inner side and threaded onto the threaded hole 245 of the nut body 241 such that the screw member 250 and the nut member 240 are fastened together. At this stage, as the screw member 250 is rotated (fastened) to fasten the screw member 250 to the nut member 240, the nut member 240 is firmly fixed to the functional bracket 222 with the stopping projections 243a, 243b engaged with the stopping grooves 224a, 224d or the stopping grooves 224b, 224c, or, in other words, located at the front side position Pf or the rear side position Pr.

In the above-described manner, the functional bracket 222 and the panel bracket 23 are connected to each other through the nut member 240 and the screw member 250.

As has been described in detail, the present embodiment has the advantages described below.

(1) In the present embodiment, by fastening the nut member 240 and the screw member 250 together, the panel bracket 23, with which the contact portion 247 is held in contact, is clamped between the nut member 240 and the screw member 250 (the contact portion 247 and the head portion 251) and fixed to the nut member 240. On the other hand, the functional bracket 222 having the attachment hole 224 is fixed to the nut member 240 in a state in which movement of the functional bracket 222 in the vehicle lateral direction is allowed within the range between the retainer portion 244, which is engaged with the corresponding edge of the attachment hole 224, and the contact portion 247. In this case, the relative positions of the panel bracket 23 and the functional bracket 222 are adjustable in the vehicle lateral direction. As a result, the panel bracket 23 and the functional bracket 222 are connected to each other with improved reliability.

At this stage, the position of the insertion portion 243 of the nut member 240 is adjusted in the front-rear direction by selecting the stopping grooves 224a, 224d or the stopping grooves 224b, 224c for engagement with the stopping projections 243a, 243b, which are formed in the insertion portion 243. Alternatively, movement of the insertion portion 243 in the front-rear direction is stopped by engaging the stopping projections 243a, 243b with the stopping grooves 224a, 224d or the stopping grooves 224b, 224c in the rotational direction in which the screw member 250 is fastened. Since the relative positions of the panel bracket 23 and the functional bracket 222 are adjustable in the front-rear direction in the above-described manner, the panel bracket 23 and the functional bracket 222 are connected together with improved reliability.

(2) In the present embodiment, the functional bracket 222 is fixed to the nut member 240 simply by assembling the plate member 242 to the nut body 241 in a state in which the insertion portion 243 of the nut body 241 is loosely inserted through the attachment hole 224 in advance. Such fixation is thus smoothly accomplished.

(3) In the present embodiment, when the panel bracket 23 is assembled in a state in which the nut member 240 is fixed to the functional bracket 222 in advance, the cover portion 248 is arranged in the assembling direction of the panel bracket 23. Accordingly, the panel bracket 23 is unlikely to enter the gap between the contact portion 247 and the retainer portion 244 and guided toward the vehicle inner side with respect to the contact portion 247. This improves ease of assembly.

(4) in the present embodiment, the retainer portion 244, which is engaged with the corresponding edge of the attachment hole 224, is formed in the nut body 241 of the nut member 240. Accordingly, even if a vehicle occupant hits the movable panel 12 by head or the vehicle overturns to apply great force to the movable panel 12 from below to above (rollover), the nut member 240 is unlikely to come off the functional bracket 222.

(5) In the present embodiment, by reducing the size of the head portion 251 of the screw member 250, which is assembled to the panel bracket 23 and the like from the vehicle inner side, space required in the assembling direction is decreased. Correspondingly, the thickness of the device as a whole is further reduced.

The third embodiment may be modified as follows.

In the third embodiment, the diameter of the retainer portion 244 of the nut body 241 may be set to a value greater than the maximum opening width of the attachment hole 224.

In the third embodiment, the washer portion 251b of the head portion 251 of the screw member 250 may be omitted and an appropriate washer may be employed. Even in this case, by decreasing the dimension of the shaft insertion hole 31, which is formed in the panel bracket 23, in the front-rear direction, the washer is reduced in size correspondingly. This improves ease of assembly and mountability in a vehicle.

In the third embodiment, three or more stopping grooves may be arranged in the front-rear direction in each of the front side portion and the rear side portion of the attachment hole 224.

In the third embodiment, either the stopping grooves 224a, 224b, which are formed in the front side portion of the attachment hole 224, or the stopping grooves 224c, 224d, which are arranged in the rear side portion of the attachment hole 224, may be omitted. In this case, the corresponding one of the stopping projection 243a, which is formed in the front side portion of the insertion portion 243, and the stopping projection 243b, which is projected from the rear side portion of the insertion portion 243, is omitted. That is, the attachment hole 224 and the insertion portion 243 do not necessarily have to be formed rotationally symmetric with respect to the center line O2.

In the third embodiment, the nut body 241 may be fixed to the plate member 242 by pressing the joint piece workpiece W (or a similar projection or boss portion) into the insertion hole 249 of the plate member 242.

The third embodiment may employ a nut member including the nut body 241 and the plate member 242 as an integral body. In this case, to fix the nut member to the functional bracket 222, the insertion portion (243) is inserted through the attachment hole 224 with the contact portion (247) or the retainer portion (244) elastically deforming.

The third embodiment may employ an appropriate urging member for urging the functional bracket 222 toward the contact portion 247 in the vehicle lateral direction. In this case, the functional bracket 222, which is urged by the urging member, is held in contact with or arranged in the vicinity of the contact portion 247. Accordingly, when the panel bracket 23 is assembled in the up-down direction with the nut member 240 held in the state temporarily assembled to the functional bracket 222, the gap in the vehicle lateral direction is blocked so that the panel bracket 23 is unlikely to enter the gap between the functional bracket 222 and the contact portion 247. This improves ease of assembly.

The urging member also decreases vibration of the functional bracket 222 in the vehicle lateral direction and noise generated by such vibration.

In the third embodiment, the nut member 240 and the screw member 250 may be fixed to the functional bracket 222 and the panel bracket 23 in reverse manners. Specifically, an attachment hole (224) is formed in the panel bracket 23 and the nut member 240 is fixed to the attachment hole. On the other hand, a shaft insertion hole (31) is formed in the functional bracket 222 and the screw member 250 is inserted through the shaft insertion hole and then fastened to the nut member 240. This modified case also ensures the same advantages as the advantages of the above described embodiments.

In the third embodiment, the functional bracket 222, which supports the movable panel 12 through the panel bracket 23, and the guide rail 213 (the rear shoe and the like) may be linked together in any suitable manner. For example, the opening 11 may be selectively opened and closed simply by pivoting the functional bracket 222 in the up-down direction about a front end portion of the functional bracket 222 as the fulcrum through movement of the rear shoe in the front-rear direction, or, in other words, through tilt-up/tilt-down operation of the movable panel 12. Alternatively, the opening 11 may be selectively opened and closed simply by moving the functional bracket 222 in the front-rear direction through movement of the rear shoe in the front-rear direction, or, in other words, through slide operation of the movable panel 12.

The invention claimed is:

1. A vehicle sunroof device comprising:
   a movable panel adapted to selectively open and close an opening formed in a roof portion of a vehicle;
   a panel bracket adapted to be fixed to the movable panel;
   a guide rail adapted to extend in a vehicle front-rear direction at a position below the movable panel;
   a guide bracket adapted to be movably supported by the guide rail, the guide bracket being opposed to the panel bracket in a vehicle lateral direction; and
   a first member and a second member, wherein
   the first member includes a holding member and a nut member, the holding member includes
      a contact portion that contacts a first bracket, which is one of the panel bracket and the guide bracket, at a position between the panel bracket and the guide bracket in the vehicle lateral direction, and
      a support wall portion that clamps the nut member between the support wall portion and the contact portion in the vehicle lateral direction,
   the nut member includes
      an insertion portion that is projected from the contact portion in the vehicle lateral direction and inserted through an attachment hole formed in a second bracket, which is the other one of the panel bracket and the guide bracket, and
      a retainer portion that is projected outward from a distal end portion of the insertion portion that extends through the attachment hole and engaged with an edge of the attachment hole to allow movement in the vehicle lateral direction of the second bracket within a certain range between the retainer portion and the contact portion,
   the second member includes a head portion that clamps the first bracket between the head portion and the contact portion and a shaft portion inserted through the first bracket in the vehicle lateral direction, the second member being fastened to the first member, and
   the first member and the second member allow relative movement of the first bracket and the second bracket in the vehicle front-rear direction when held in a non-fastened state and restrict the relative movement of the first bracket and the second bracket in the vehicle front-rear direction when held in a fastened state.

2. The vehicle sunroof device according to claim 1, further comprising an urging member that urges the second bracket toward the contact portion in the vehicle lateral direction.

3. The vehicle sunroof device according to claim 1, wherein the first member includes a cover portion that is extended from the contact portion in the vehicle lateral direction and covers the second bracket.

4. The vehicle sunroof device according to claim 1, wherein
   the contact portion also functions as an engagement portion that is engaged with the second bracket and restricts movement of the second bracket in the vehicle front-rear direction, and
   an insertion hole through which the shaft portion is inserted in the vehicle lateral direction is formed in the contact portion and extends in the vehicle front-rear direction.

5. The vehicle sunroof device according to claim 4, wherein
   the insertion portion is loosely inserted through the attachment hole, and
   the contact portion functioning as the engagement portion is engaged with an engagement projection projected from the second bracket in the vehicle lateral direction, and
   wherein the second member is configured to be fastened to the nut member and join the first bracket and the holding member together by jointly fastening the first bracket and the holding member.

6. The vehicle sunroof device according to claim 1, wherein an engagement piece to be engaged with the retainer portion is formed in the support wall portion.

* * * * *